(12) United States Patent
Woo et al.

(10) Patent No.: US 10,850,368 B2
(45) Date of Patent: Dec. 1, 2020

(54) NONWOVEN ABRASIVE ARTICLES AND METHODS OF MAKING THE SAME

(71) Applicant: 3M INNOVATIVE PROPERTIES COMPANY, St. Paul, MN (US)

(72) Inventors: Edward J. Woo, Woodbury, MN (US); Nataliya V. Fedorova, Woodbury, MN (US); Jaime A. Martinez, Woodbury, MN (US); Scott A. Baum, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/523,419

(22) Filed: Jul. 26, 2019

(65) Prior Publication Data

US 2019/0345897 A1 Nov. 14, 2019

Related U.S. Application Data

(62) Division of application No. 14/780,912, filed as application No. PCT/EP2014/031248 on Mar. 19, 2014, now Pat. No. 9,982,633.

(Continued)

(51) Int. Cl.
*B24D 3/28* (2006.01)
*B24D 11/00* (2006.01)

(Continued)

(52) U.S. Cl.
CPC .............. *B24D 3/32* (2013.01); *B24D 3/346* (2013.01); *B24D 11/001* (2013.01); *B24D 18/0027* (2013.01); *F02B 29/0418* (2013.01); *F02B 37/16* (2013.01); *F02D 19/023* (2013.01); *F02D 19/105* (2013.01); *F02D 41/0027* (2013.01); *F02M 21/04* (2013.01);

(Continued)

(58) Field of Classification Search
CPC .......... B24D 11/001; B24D 3/28; B24D 3/32; B24D 3/346; B24D 3/34; B24D 3/344
See application file for complete search history.

(56) References Cited

U.S. PATENT DOCUMENTS 2,958,593 A 11/1960 Hoover
4,314,827 A 2/1982 Leitheiser (Continued)

FOREIGN PATENT DOCUMENTS

CN 1780953 A 5/2006
CN 102958649 A 3/2013

(Continued)

OTHER PUBLICATIONS

International Search Report for PCT International Application No. PCT/US2014/031248, dated Jul. 7, 2014, 4pgs.

*Primary Examiner* — Long T Tran
(74) *Attorney, Agent, or Firm* — Katherine M. Scholz

(57) ABSTRACT

Nonwoven abrasive articles comprise a nonwoven abrasive member having an overlayer composition comprising a fatty acid metal salt disposed thereon adjacent to a working surface. The nonwoven abrasive member comprises abrasive particles adhered to a fiber web by a binder. The abrasive particles may be exposed and/or the nonwoven abrasive member may have suitable frictional properties. Methods of making the same are also disclosed.

11 Claims, 24 Drawing Sheets

Related U.S. Application Data

(60) Provisional application No. 61/806,630, filed on Mar. 29, 2013.

(51) Int. Cl.

| | | |
|---|---|---|
| *B24D 3/32* | (2006.01) | |
| *B24D 3/34* | (2006.01) | |
| *F02M 26/04* | (2016.01) | |
| *F02B 29/04* | (2006.01) | |
| *F02B 37/16* | (2006.01) | |
| *F02D 19/02* | (2006.01) | |
| *F02D 19/10* | (2006.01) | |
| *F02D 41/00* | (2006.01) | |
| *F02M 21/04* | (2006.01) | |
| *F02M 43/00* | (2006.01) | |
| *B24D 18/00* | (2006.01) | |
| *F02D 41/14* | (2006.01) | |

(52) U.S. Cl.
CPC .......... *F02M 21/047* (2013.01); *F02M 26/04* (2016.02); *F02M 43/00* (2013.01); *F02D 2041/1433* (2013.01); *F02D 2041/1434* (2013.01); *F02D 2200/0402* (2013.01); *Y02T 10/144* (2013.01); *Y02T 10/146* (2013.01); *Y02T 10/32* (2013.01); *Y02T 10/36* (2013.01)

(56) References Cited

U.S. PATENT DOCUMENTS

| | | |
|---|---|---|
| 4,378,975 A | 4/1983 | Tomlinson |
| 4,609,380 A | 9/1986 | Barnett |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 4,964,883 A | 10/1990 | Morris |
| 4,988,554 A | 1/1991 | Peterson et al. |
| 5,009,676 A | 4/1991 | Rue |
| 5,011,508 A | 4/1991 | Wald |
| 5,164,348 A | 11/1992 | Wood |
| 5,178,646 A | 1/1993 | Barber, Jr. |
| 5,185,012 A | 2/1993 | Kelly |
| 5,244,477 A | 9/1993 | Rue |
| 5,355,636 A | 10/1994 | Harmon |
| 5,372,620 A | 12/1994 | Rowse |
| 5,500,273 A | 3/1996 | Holmes |
| 5,591,239 A | 1/1997 | Larson |
| 5,667,542 A | 9/1997 | Law |
| 5,704,952 A | 1/1998 | Law |
| 5,786,065 A | 7/1998 | Annis |
| 5,888,594 A | 3/1999 | David |
| 5,948,166 A | 9/1999 | David |
| 5,954,844 A * | 9/1999 | Law ...................... B24D 3/004 51/295 |
| 6,017,831 A | 1/2000 | Beardsley |
| 6,228,133 B1 | 5/2001 | Thurber |
| 6,261,682 B1 | 7/2001 | Law |
| 6,287,184 B1 * | 9/2001 | Carpentier .......... B24D 11/008 451/526 |
| 6,299,520 B1 | 10/2001 | Cheyne |
| 6,406,504 B1 | 6/2002 | Lise |
| 6,521,004 B1 * | 2/2003 | Culler ...................... B24D 3/14 23/313 R |
| 6,572,666 B1 * | 6/2003 | Nettleship ................ B24D 3/28 51/293 |
| 6,802,875 B1 * | 10/2004 | Kimbara ................... C01B 3/26 48/61 |
| 7,195,360 B2 | 3/2007 | Bacon, Jr. |
| 7,195,658 B2 | 3/2007 | Swei |
| 7,811,342 B1 | 10/2010 | Hsu |
| 8,034,137 B2 | 10/2011 | Erickson |
| 8,123,828 B2 | 2/2012 | Culler |
| 8,142,531 B2 | 3/2012 | Adefris |
| 8,142,532 B2 | 3/2012 | Erickson |
| 2002/0026752 A1 * | 3/2002 | Culler ...................... B24D 3/28 51/298 |
| 2003/0134515 A1 | 7/2003 | David |
| 2004/0098923 A1 | 5/2004 | Hood |
| 2004/0253895 A1 | 12/2004 | Castellani |
| 2005/0271888 A1 * | 12/2005 | Moncla ................ C09D 131/04 428/523 |
| 2006/0010628 A1 | 1/2006 | Moskovich |
| 2006/0016128 A1 | 1/2006 | Oka |
| 2006/0041065 A1 | 2/2006 | Barber, Jr. |
| 2008/0127572 A1 | 6/2008 | Ludwig |
| 2008/0160879 A1 | 7/2008 | Peterson |
| 2010/0077673 A1 | 4/2010 | Oka |
| 2010/0146867 A1 | 6/2010 | Boden |
| 2010/0151195 A1 | 6/2010 | Culler |
| 2010/0255254 A1 | 10/2010 | Culler |
| 2012/0009850 A1 | 1/2012 | Hsu |
| 2012/0088443 A1 | 4/2012 | Hsu |
| 2013/0012112 A1 | 1/2013 | Hsu |
| 2016/0052106 A1 | 2/2016 | Woo |

FOREIGN PATENT DOCUMENTS

| | | |
|---|---|---|
| CN | 103476979 A | 12/2013 |
| DE | 101056743 A | 10/2007 |
| JP | H03-043158 A | 2/1991 |
| JP | 2001/334473 A | 12/2001 |
| JP | 2012-219381 A | 11/2012 |
| JP | 2012-219391 A | 11/2012 |
| WO | WO 97/42003 A1 | 11/1997 |
| WO | WO 99/53614 A1 | 11/1999 |
| WO | WO 99/56914 A1 | 11/1999 |
| WO | WO 02/084004 A2 | 10/2002 |
| WO | WO 2012-012940 | 2/2012 |

\* cited by examiner

NONWOVEN ABRASIVE ARTICLES AND METHODS OF MAKING THE SAME

CROSS REFERENCE TO RELATED APPLICATIONS

This application is a divisional of U.S. application Ser. No. 14/780,912, filed Sep. 28, 2015, now allowed, which is a national stage filing under 35 U.S.C. 371 of PCT/US2014/031248, filed Mar. 19, 2014, which claims the benefit of U.S. Provisional Application No. 61/806,630, filed Mar. 29, 2013, the disclosure of which is incorporated by reference in its entirety herein.

TECHNICAL FIELD

The present disclosure relates broadly to nonwoven abrasive articles and methods of making them.

BACKGROUND

Nonwoven abrasive articles comprising a three-dimensional fiber web bonded at contact points between adjacent fibers are used extensively in the manufacture of abrasive articles for cleaning, abrading, finishing and polishing applications on any of a variety of surfaces. In addition to the nonwoven web, the nonwoven abrasive articles generally include abrasive particles and a binder material (commonly termed a "binder") that bonds the fibers within the nonwoven web to each other and secures the abrasive particles to the nonwoven web.

One common type of nonwoven abrasive includes a lofty open fiber web. Exemplary of such nonwoven abrasive articles are those described in U.S. Pat. No. 2,958,593 (Hoover et al.). Exemplary commercial nonwoven abrasive articles include nonwoven abrasive hand pads such as those marketed by 3M Company of Saint Paul, Minn. under the trade designation SCOTCH-BRITE.

Other examples of nonwoven abrasive articles include convolute abrasive wheels and unitized abrasive wheels. Nonwoven abrasive wheels typically have abrasive particles distributed through the layers of nonwoven web bonded together with a binder that bonds layers of nonwoven webs together, and likewise bonds the abrasive particles to the nonwoven web. Unitized abrasive wheels have individual discs of nonwoven web arranged in a parallel fashion to form a cylinder having a hollow axial core. Alternatively, convolute abrasive wheels have a nonwoven web that is spirally wound about and affixed to a core member.

Regardless of the construction of the nonwoven abrasive articles, their abrading performance generally decreases over time with use. A continuing need exists for ways to extend the useful abrading life of nonwoven abrasive articles.

SUMMARY

The present inventors have discovered that application of an overlayer composition comprising a metal stearate to nonwoven abrasive articles having abrasive particles that are not deeply submerged within the binder material improves abrading performance, while in cases where the abrasive particles that are deeply submerged, addition of the same overlayer composition results in degraded abrading performance.

In one aspect, the present disclosure provides a nonwoven abrasive article comprising:
a) a nonwoven abrasive member having a working surface, wherein the nonwoven abrasive member comprises:
  a lofty open fiber web comprising fibers bonded to one another;
  abrasive particles adhered to at least a portion of the fibers by a binder material, wherein at least a portion of the abrasive particles form a visible outer layer of the abrasive particles along the fibers adjacent to the working surface of the nonwoven abrasive member, wherein the abrasive particles in the visible outer layer are closely packed, and wherein on a numerical basis at least 80 percent of the abrasive particles in the visible outer layer have recognizable outlines; and
b) an overlayer composition disposed on at least a portion of the visible outer layer of the abrasive particles thereby forming the nonwoven abrasive article, wherein the overlayer composition comprises a fatty acid metal salt.

In another aspect, the present disclosure provides a method of making an abrasive article, the method comprising sequentially:
a) providing a nonwoven abrasive member having a working surface, wherein the nonwoven abrasive member comprises:
  a lofty open fiber web comprising fibers bonded to one another;
  abrasive particles adhered to at least a portion of the fibers by a binder material, wherein at least a portion of the abrasive particles form a visible outer layer of the abrasive particles along the fibers adjacent to the working surface of the nonwoven abrasive member, wherein the abrasive particles in the visible outer layer are closely packed, and wherein on a numerical basis at least 80 percent of the abrasive particles in the visible outer layer have recognizable outlines; and
b) disposing an overlayer composition on at least a portion of the visible outer layer of the abrasive particles thereby forming the nonwoven abrasive article, wherein the overlayer composition comprises a fatty acid metal salt.

The present inventors have further developed a convenient test that can predict which nonwoven abrasive articles will benefit from application of a metal-stearate containing overlayer composition.

Accordingly, in yet another aspect, the present disclosure provides a nonwoven abrasive article comprising:
a nonwoven abrasive member having a working surface, wherein the nonwoven abrasive member comprises:
  a lofty open fiber web comprising fibers bonded to one another; and
  abrasive particles adhered to the fibers by a binder material, wherein the working surface of the nonwoven abrasive member has a kinetic coefficient of friction of at least 0.54 according to the FRICTION TEST described herein; and
an overlayer composition disposed on at least a portion of the binder material and abrasive particles adjacent to the working surface thereby forming the nonwoven abrasive article, wherein the overlayer composition comprises a fatty acid metal salt.

Likewise, in yet another aspect, the present disclosure provides a method of making an abrasive article, the method comprising sequentially:
providing a nonwoven abrasive member having a working surface, wherein the nonwoven abrasive member comprises:
  a lofty open fiber web comprising fibers bonded to one another;

abrasive particles adhered to the fibers by a binder material, wherein the working surface of the nonwoven abrasive member has a kinetic coefficient of friction of at least 0.54 according to the FRICTION TEST described herein; and disposing an overlayer composition on at least a portion of the binder material and the abrasive particles adjacent to the working surface thereby forming the nonwoven abrasive article, wherein the overlayer composition comprises a fatty acid metal salt.

In view of the above, the present disclosure also provides a method of making an abrasive article, the method comprising:

a) providing a nonwoven abrasive member having a working surface, wherein the nonwoven abrasive member comprises:

a lofty open fiber web comprising fibers bonded to one another; and abrasive particles adhered to at least a portion of the fibers by a binder material, wherein at least a portion of the abrasive particles are at least partially embedded in the binder material; and b) plasma-etching a portion of the binder material adjacent to the working surface to expose portions of the abrasive particles previously embedded in the binder material to provide a plasma-etched nonwoven abrasive member; and c) disposing an overlayer composition on at least a portion of the working surface of the plasma-etched nonwoven abrasive member, wherein the overlayer composition comprises a fatty acid metal salt.

As used herein, the term "closely packed" in reference to abrasive particles means that substantially all of the abrasive particles are within a distance (between outer surfaces) of one average particle diameter to the nearest abrasive particle, but does not necessarily mean that the abrasive particles are in the closest theoretically possible packing arrangement.

As used herein, the term "recognizable outline" in reference to an abrasive particle means that the peripheral outline of the abrasive particle as viewed from at least one direction is discernible at a magnification of 150 times (i.e., 150×) by a human eye having 20/20 vision.

For example, the abrasive particles are not substantially submerged in a mass of binder material, although they may have a thin (e.g., substantially uniform) coating of binder covering them if it conforms to the shapes of the abrasive particles.

As used herein, the FRICTION TEST is as follows:

Test specimens of nonwoven abrasive members and polymethyl methacrylate discs to be used in this test procedure are equilibrated for at least 24 hours at 17 percent relative humidity and 25° C. prior to use. A standard testing surface is prepared by attaching a 4-inch (10.2 cm) diameter by ⅛-inch (3.2-mm) thick polymethyl methacrylate (PMMA) disc, M Ball hardness 90-105 onto a horizontal test stage such that it cannot move relative to the stage during the test. The surface roughness of the PMMA surface is: $R_a$=0.384+/−0.08 microinch (0.0098+/−0.002 micron), $R_z$=3.95+/−0.32 microinches (0.100+/−0.008 micron), $R_{max}$=6.09+/−0.67 microinches (0.155+/−0.017 micron). Next, a 2 inches×2 inches (5 cm×5 cm) area test specimen is cut from a nonwoven abrasive member to be tested and affixed to a 2 inches×2 inches (5 cm×5 cm) 500-gram metal weight using double-sided pressure-sensitive adhesive tape, assuring that the 2 inches×2 inches area of the test specimen is adjacent to the metal weight.

The weighted test specimen is placed, with a working surface (i.e., a surface of the nonwoven abrasive member intended to abrade a workpiece) in contact with the PMMA disc, on the test surface and attached to the load cell of a friction testing machine (e.g., a Thwing-Albert Friction/Peel Tester Model 225-100 from Thwing-Albert Instrument Company, West Berlin, N.J. or a functional equivalent) at 17 percent relative humidity and 25° C. Horizontal force is applied by the friction testing machine at a horizontal stage translational speed of 31 cm/minute and the kinetic coefficient of friction is determined as the average kinetic coefficient of friction over a 5-second intervals. Nonwoven abrasive members typically have one working surface (e.g., belts) or two working surfaces (e.g., hand pads). In the case that the nonwoven abrasive member has multiple working surfaces, any working surface may be used.

FIG. 24 shows an exemplary configuration for carrying out the FRICTION TEST described above. Referring now to FIG. 24, PMMA disc 2420 is attached to horizontal test stage 2450. The nonwoven abrasive member test specimen 2410 is placed upon PMMA disc 2420 and metal weight 2400 is secured with double-sided tape 2415 to test specimen 2410. Horizontal rod 2430 is attached to the friction testing device load cell 2460 and metal weight 2400. Force is applied along direction 2470 by the friction testing machine during the test.

Features and advantages of the present disclosure will be further understood upon consideration of the detailed description as well as the appended claims.

Figure 1A:
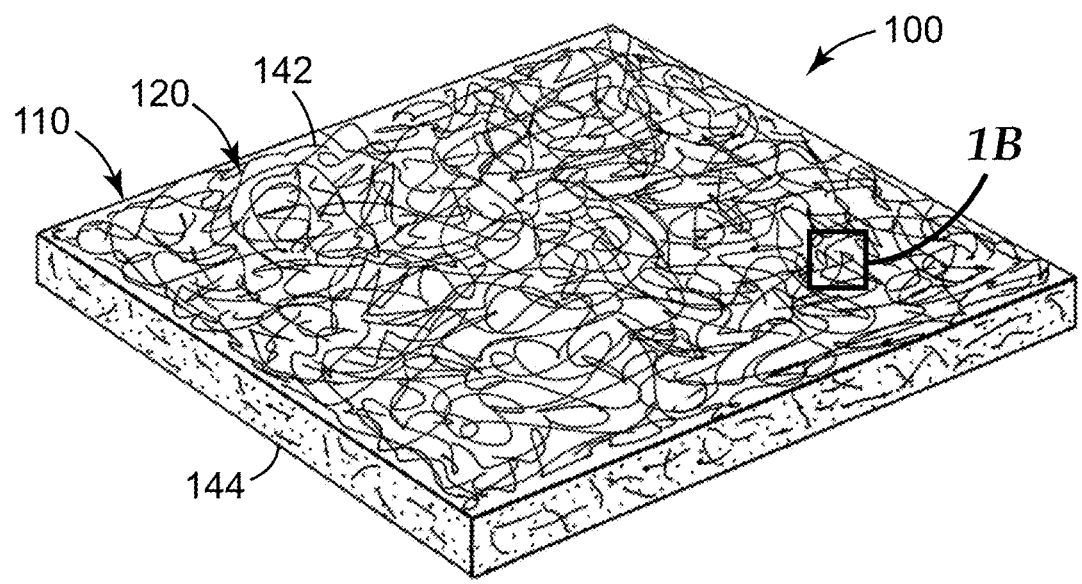
FIG. 1A is a perspective view of an exemplary nonwoven abrasive article 100 according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Figure 1B:
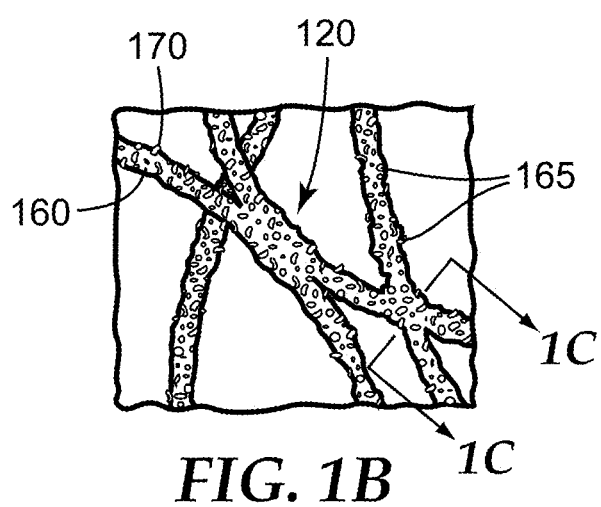
FIG. 1B is an enlarged view of region 1B of nonwoven abrasive article 100 shown in FIG. 1A.
Figure 1C:
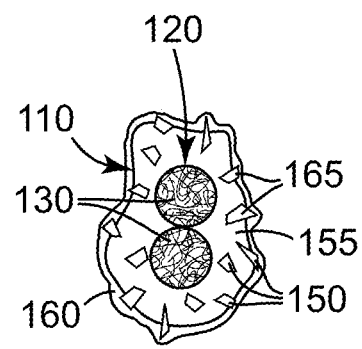
FIG. 1C is a cross-sectional view of bonded fibers shown in FIG. 1B taken along line 1C-1C.

Referring now to FIGS. 1A-1C, exemplary nonwoven abrasive article 100 comprises nonwoven abrasive member 110. The nonwoven abrasive member 110 comprises lofty open fiber web 120 comprising fibers 130 bonded to one another. Nonwoven abrasive member 110 has first and second opposed working surfaces 142, 144. Abrasive particles 150 are adhered to fibers 130 by binder material 155.

Figure 10:
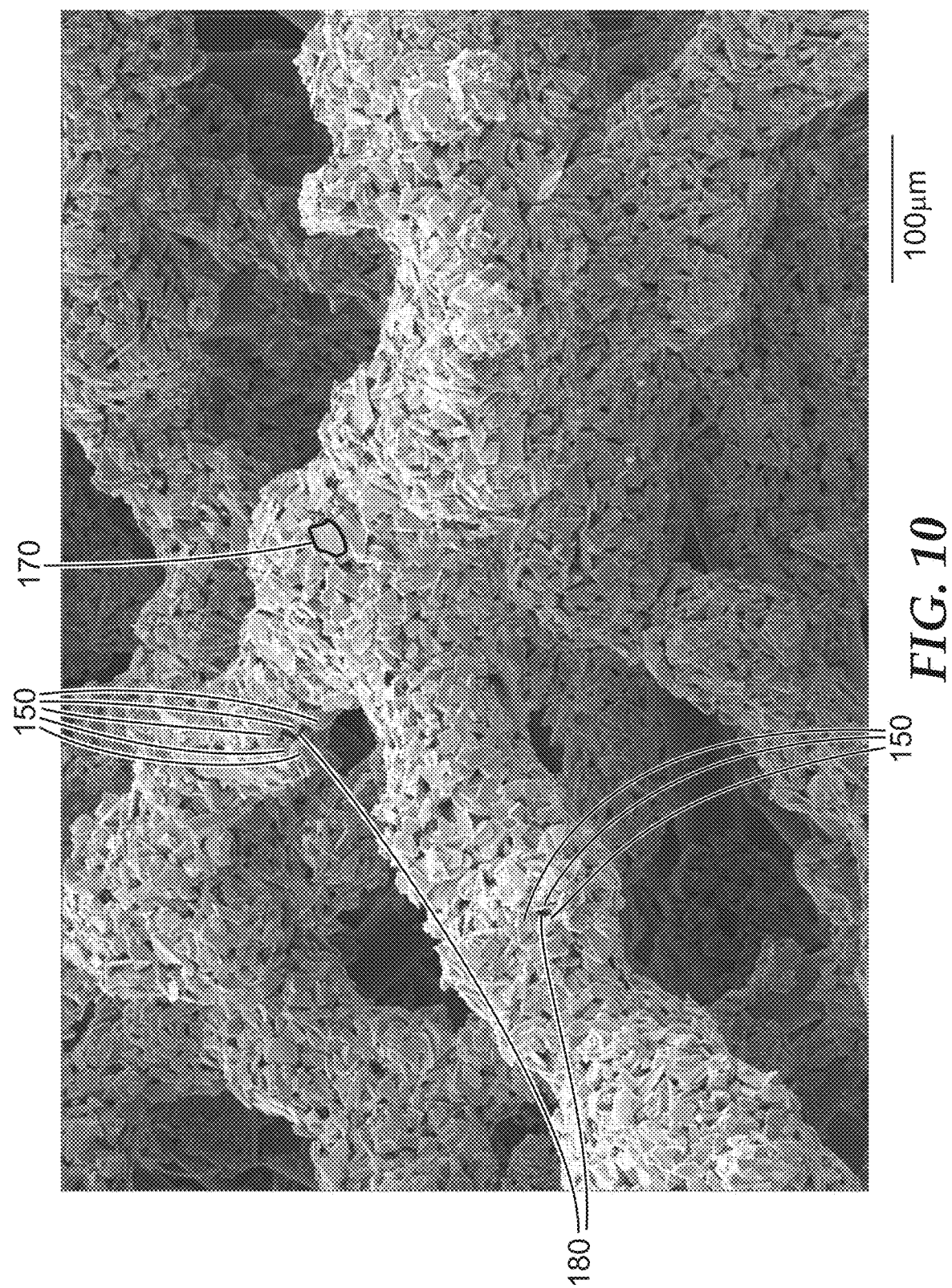
Figure 11:
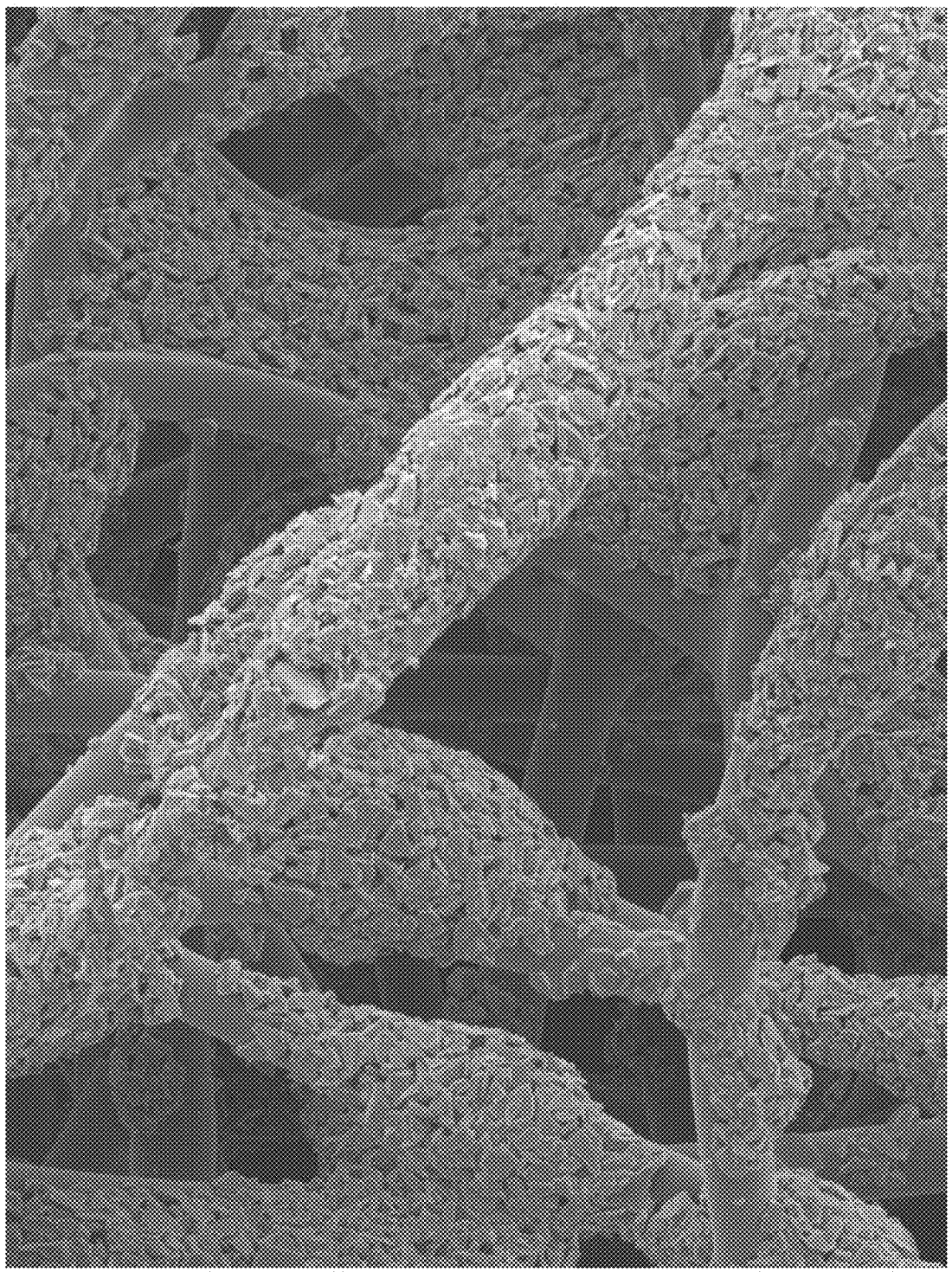
Figure 12:
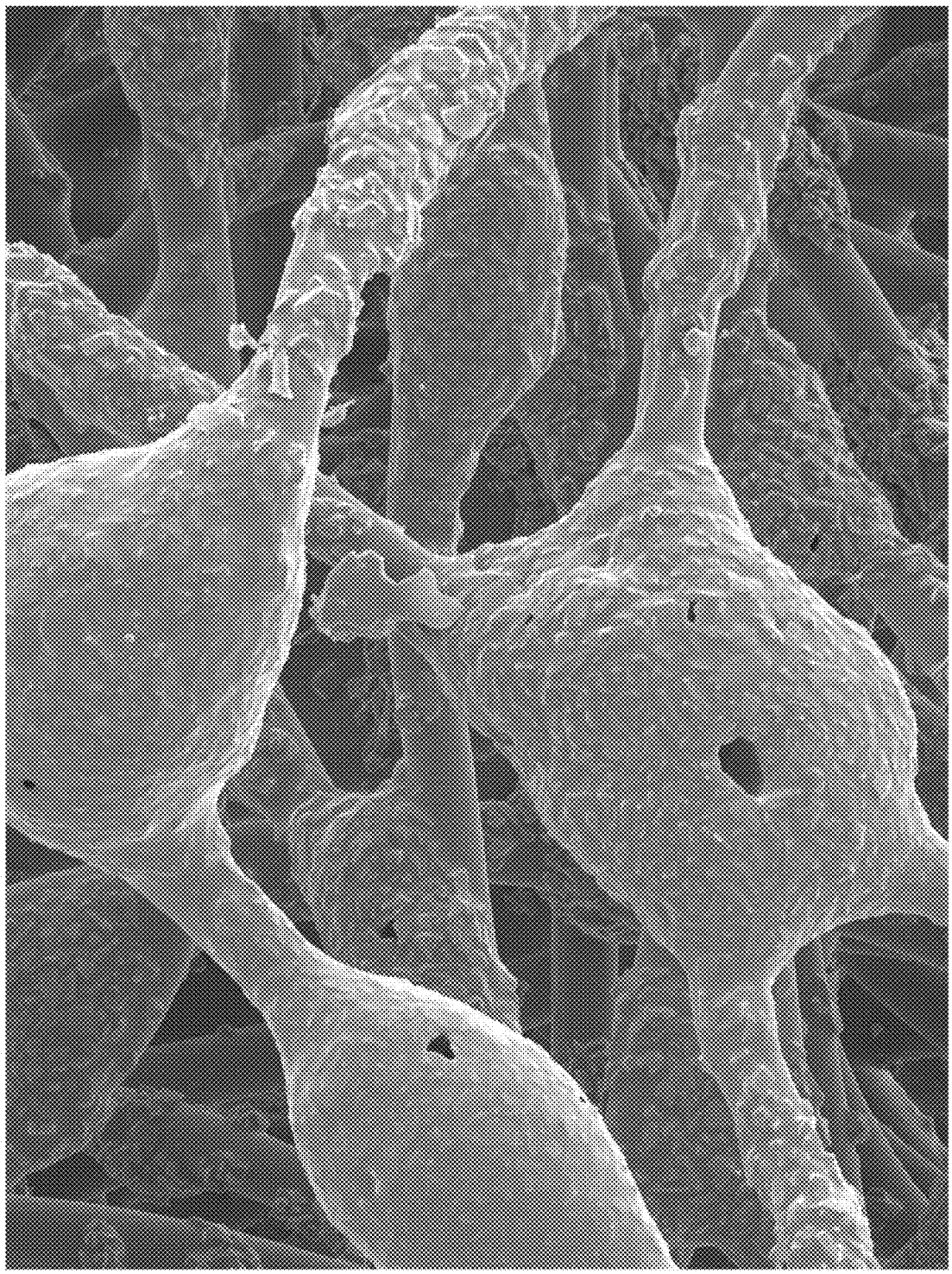
FIG. 12 is a SEM micrograph of the nonwoven abrasive member used in Comparative Example C.

In some embodiments, shown in FIGS. 1A-1C, abrasive particles 150 adjacent to working surfaces 142, 144 form a visible outer layer 165 of abrasive particles 150 along fibers 130. Abrasive particles 150 in visible outer layer 165 are closely packed and have recognizable outlines 170 (see also FIG. 10). Overlayer composition 160 comprises a fatty acid metal salt, and is disposed on at least a portion of binder material 155 and abrasive particles 150 adjacent to working surfaces 142 and 144 of nonwoven abrasive member 110.

In some embodiments, on a numerical basis the percentage of abrasive particles in the visible outer layer may be at least 80 percent, at least 85 percent, at least 90 percent, at least 95 percent, at least 97 percent, or 99 percent, or even 100 percent.

In some embodiments, crevices are disposed between adjacent abrasive particles in the visible outer layer. For example, referring to FIG. 10, crevices 180 are disposed between adjacent abrasive particles 150.

Figure 15:
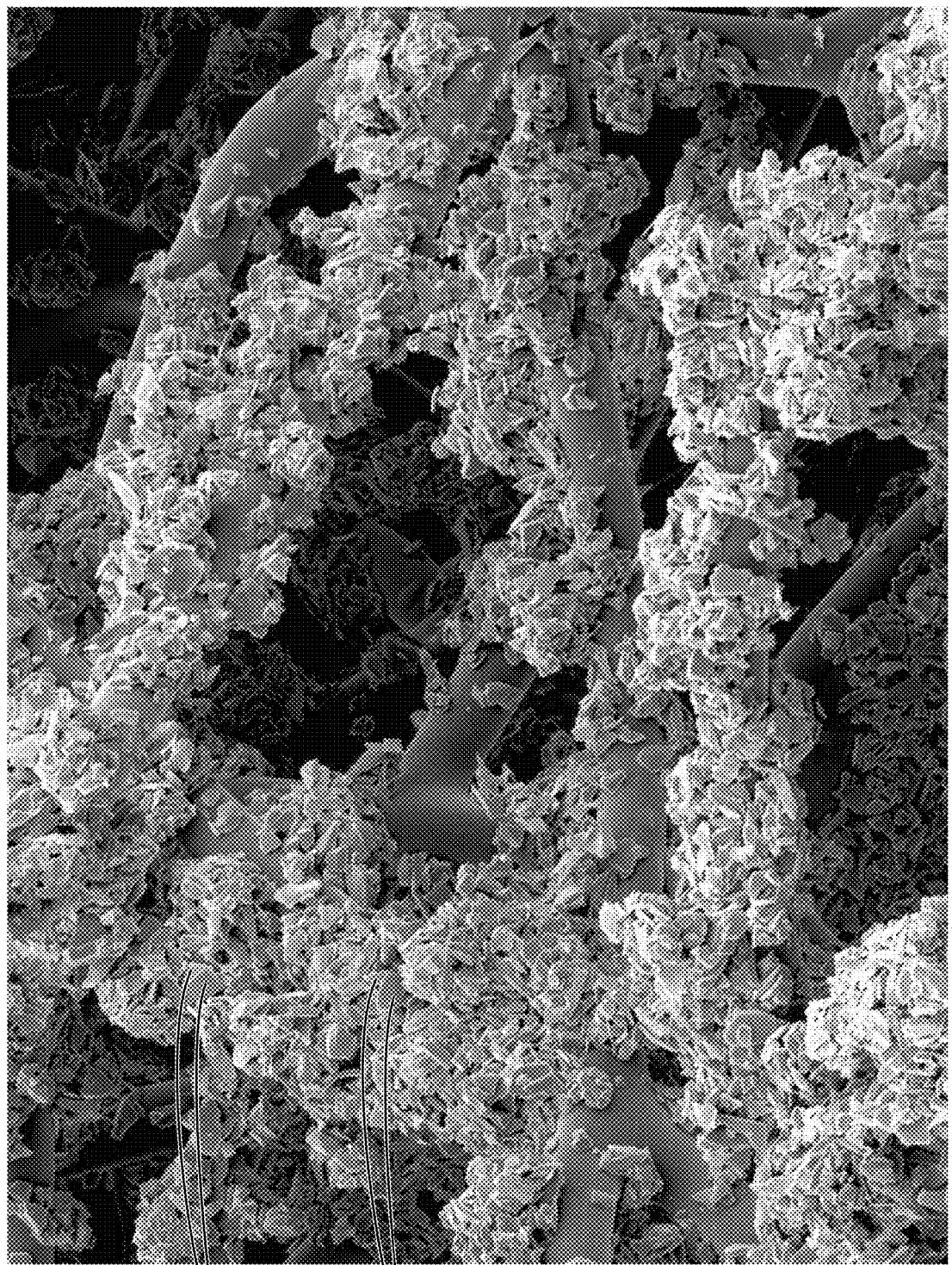

In some embodiments, at least a portion of the abrasive particles in the visible outer layer of the abrasive particles overlap one another, for example, as shown in FIG. 15, wherein abrasive particles 150 overlap adjacent abrasive particles.

In some embodiments, at least one of working surfaces 142, 144 has a kinetic coefficient of friction which may be at least 0.54 according to the FRICTION TEST described herein.

The lofty open fiber web is a lofty nonwoven fibrous material having a substantially continuous network of voids extending therethrough. By use of the term "lofty open fiber web", what is intended is a layer of nonwoven web material composed of a plurality of randomly oriented fibers, typically entangled, having a substantially continuous network of interconnecting voids extending therethrough.

Nonwoven fiber webs are typically selected to be suitably compatible with adhering binders and abrasive particles while also being processable in combination with other components of the article, and typically can withstand processing conditions (e.g., temperatures) such as those employed during application and curing of the curable composition. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), polyamides (e.g., nylon 6, nylon 6/6, and nylon 10), polyolefins (e.g., polyethylene, polypropylene, and polybutylene), acrylic polymers (e.g., polyacrylonitrile and copolymers containing acrylic monomers), rayon, cellulose acetate, polyvinylidene chloride-vinyl chloride copolymers, and vinyl chloride-acrylonitrile copolymers. Examples of suitable natural fibers include cotton, wool, jute, and hemp. The fibers may be of virgin material or of recycled or waste material, for example, reclaimed from garment cuttings, carpet manufacturing, fiber manufacturing, or textile processing. The fibers may be homogenous or a composite such as a bicomponent fiber (e.g., a co-spun sheath-core fiber). The fibers may be tensilized and crimped. They may be chopped fibers (i.e., staple fibers) or continuous filaments such as those formed by an extrusion process. Combinations of fibers may also be used.

The fibers may comprise continuous fiber, staple fiber, or a combination thereof. For example, the fiber web may comprise staple fibers having a length of at least about 20 millimeters (mm), at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide a nonwoven abrasive article that upon use will result in a specifically preferred surface finish.

Nonwoven fiber webs may be made, for example, by conventional air laid, carded, stitch bonded, spun bonded, wet laid, and/or melt blown procedures. Air laid fiber webs may be prepared using equipment such as, for example, that available as a RANDO WEBBER from Rando Machine Company of Macedon, N.Y.

Frequently, as known in the abrasive art, it is useful to apply a pre-bond resin to the nonwoven fiber web prior to coating with the curable composition. The pre-bond resin serves, for example, to help maintain the nonwoven fiber web integrity during handling, and may also facilitate bonding of the urethane binder to the nonwoven fiber web. Examples of pre-bond resins include phenolic resins, urethane resins, hide glue, acrylic resins, urea-formaldehyde resins, melamine-formaldehyde resins, epoxy resins, and combinations thereof. The amount of pre-bond resin used in this manner is typically adjusted to bond the fibers together at their points of crossing contact. In those cases, wherein the nonwoven fiber web includes thermally bondable fibers, thermal bonding of the nonwoven fiber web may also be helpful to maintain web integrity during processing.

The lofty open fiber web typically has a thickness of at least 3 mm, more typically at least 6 millimeters, and more typically at least 10 millimeters, although other thicknesses may also be used. Common thicknesses for the lofty open fiber web are, for example, 6.35 mm (¼ inch) and 12.7 mm (½ inch). Addition of a pre-bond binder onto the fibrous mat does not significantly alter the thickness of the lofty open fiber web.

The basis weight of the lofty open fiber web (fibers only, with no pre-bond binder layer) is typically from about 50 grams per square meter to about 1 kilogram per square meter, and more typically from about 70 to about 600 grams per square meter, although other basis weights may also be used. Typically, a pre-bond binder is applied to the lofty open fiber web to lock the fibers. The basis weight of the lofty open fiber web, with pre-bond binder, is typically from about 60 grams per square meter to about 2 kilogram per square meter, and more typically from about 80 grams to about 1.5 kilogram per square meter, although this is not a requirement.

The lofty open fiber web can be prepared by any suitable web forming operation. For example the lofty open fiber web may be carded, spunbonded, spunlaced, melt blown, air laid, or made by other processes as are known in the art. For example, the lofty open fiber web may be cross-lapped, stitchbonded, and/or needletacked.

Useful abrasive particles may be organic or inorganic particles. Examples of suitable inorganic abrasive particles include alumina or aluminum oxide, (such as fused aluminum oxide, heat treated fused aluminum oxide, ceramic aluminum oxide, heat treated aluminum oxide), silicon carbide, titanium diboride, alumina zirconia, diamond, boron carbide, ceria, aluminum silicates, cubic boron nitride, garnet, silica, and combinations thereof. The abrasive particles may be in the form of, for example, individual particles, agglomerates, composite particles, and mixtures thereof. Preferred fused aluminum oxides include those available commercially pretreated by Exolon ESK Company, Tonawanda, N.Y., or Washington Mills Electro Minerals Corp., Niagara Falls, N.Y. Preferred ceramic aluminum oxide abrasive particles include those described in U.S. Pat. No. 4,314,827 (Leitheiser); U.S. Pat. No. 4,623,364 (Cottringer et al.); U.S. Pat. No. 4,744,802 (Schwabel et al.); U.S. Pat. No. 4,770,671 (Monroe et al.); U.S. Pat. No. 4,881,951 (Monroe et al.); U.S. Pat. No. 4,964,883 (Morris et al.); U.S. Pat. No. 5,011,508 (Wald et al.); and U.S. Pat. No. 5,164,348 (Wood).

Organic abrasive particles suitable for use in abrasive article are preferably formed from a thermoplastic polymer and/or a thermosetting polymer. Organic abrasive particles can be formed from a thermoplastic material such as polycarbonate, polyetherimide, polyester, polyvinyl chloride (PVC), polymethyl methacrylate, polyethylene, polysulfone, polystyrene, acrylonitrile-butadiene-styrene block copolymer, polypropylene, acetal polymers, polyurethanes, polyamide, and combinations thereof. The organic abrasive particle may be a mixture of a thermoplastic polymer and a thermosetting polymer.

The abrasive particles, either inorganic or organic, can have any precise shape or can be irregularly or randomly shaped. Examples of such three-dimensional shapes include: pyramids, cylinders, cones, spheres, blocks, cubes, polygons, and the like. Alternatively, the organic abrasive particles can be relatively flat and have a cross sectional shape such as a diamond, cross, circle, triangle, rectangle, square, oval, octagon, pentagon, hexagon, polygon and the like. Shaped abrasive particles, and methods of making them, are taught in U.S. Pat. No. 5,009,676 (Rue et al.); U.S. Pat. No. 5,185,012 (Kelly); U.S. Pat. No. 5,244,477 (Rue et al.); U.S. Pat. No. 5,372,620 (Culler et al.); U.S. Pat. No. 8,142,531 B2 (Adefris et al.); U.S. Pat. No. 8,142,532 B2 (Boden et al.); U.S. Pat. No. 8,123,828 B2 (Culler et al.); and U.S. Pat. No. 8,034,137 B2 (Erickson et al.); and in U.S. Patent Appln. Publ. Nos. 2010/0146867 A1 (Boden et al.) and 2010/0151195 A1 (Culler et al.). Shaped thermosetting organic abrasive particles can be made in accordance with U.S. Pat. No. 5,500,273 (Holmes et al.).

The surface of the abrasive particles (a portion of their surface, or the entire surface) may be treated with coupling agents to enhance adhesion to and/or dispersibility in the binder material.

The abrasive particles may be of any size. They may comprise a mixture of chemically-different particles. For a given composition, the abrasive particle size distribution may be monomodal or polymodal (e.g., bimodal). The abrasive particles may, for example, have an average diameter of at least about 0.1 micron, at least about 1 micron, at least about 5 microns, or at least about 10 microns, and/or less than about 2000, less than about 1300 microns, or less than about 1000 microns, although larger and smaller abrasive particles may also be used. For example, the abrasive particles may have an abrasives industry specified nominal grade. Such abrasives industry accepted grading standards include those known as the American National Standards Institute, Inc. (ANSI) standards, Federation of European Producers of Abrasive Products (FEPA) standards, and Japanese Industrial Standard (JIS) standards. Exemplary ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Exemplary FEPA grade designations include P8, P12, P16, P24, P36, P40, P50, P60, P80, P100, P120, P150, P180, P220, P320, P400, P500, 600, P800, P1000, and P1200. Exemplary JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10000.

Typically, the coating weight for the abrasive particles (independent of other ingredients in the curable composition) may depend, for example, on the particular binder precursor used, the process for applying the abrasive particles, and the size of the abrasive particles. For example, the coating weight of the abrasive particles on the nonwoven fiber web (before any compression) may be at least 50 grams per square meter (gsm), at least 200 gsm, or at least 400 gsm; and/or less than 2000 gsm, less than about 1600 gsm, or less than about 1200 gsm, although other coating weights may be also be used.

The abrasive particles are adhered to the fiber web by the binder material that is typically derived from a thermosetting (e.g., polymerizable and/or cross-linkable) organic binder precursor, which is hardened or cured to form the binder material. During the manufacture of abrasive articles, the binder precursor is exposed to an energy source which aids in the initiation of the polymerization or curing process. Examples of energy sources include thermal energy and radiation energy. During this polymerization process, the binder precursor is polymerized and converted into a solidified binder. Once cured, the resultant binder is generally non-tacky.

Examples of binder precursors that may be at least partially cured to form the binder material include condensation curable materials and/or addition polymerizable materials. Such binder precursors may be solvent-based, water-based, or 100 percent solids. Examples of organic resins suitable for use in the binder precursor/binder include phenolic resins (both resoles and novolacs), urea-formaldehyde resins, melamine-formaldehyde resins, urethanes, acrylated urethanes, acrylated epoxies, ethylenically-unsaturated compounds (acrylic and methacrylic monomers, aminoplast derivatives having pendant unsaturated carbonyl groups, isocyanurate derivatives having at least one pendant acrylate group, isocyanate derivatives having at least one pendant acrylate group, vinyl ethers, epoxy resins, mixtures and combinations thereof. Other materials not within these groups may also be suitable in the binder.

Exemplary phenolic resins suitable for use in binder precursors include resole phenolic resins and novolac phenolic resins. Exemplary commercially available phenolic materials include those having the trade designations DUREZ or VARCUM (available from Occidental Chemical Corporation, Dallas, Tex.); RESINOX (available from Monsanto Company, St. Louis, Mo.); AROFENE or AROTAP (available from Ashland Chemical Company, Columbus, Ohio); and BAKELITE from Dow Chemical Company, Midland, Mich. Further details concerning suitable phenolic resins may be found, for example, in U.S. Pat. No. 5,591,239 (Larson et al.) and U.S. Pat. No. 5,178,646 (Barber, Jr. et al.).

Exemplary epoxy resins include the diglycidyl ether of bisphenol A, as well as materials that are commercially available under the trade designations EPON (e.g., EPON 828, EPON 1004, and EPON 1001F) from Momentive, Houston, Tex.; and under the trade designations DER (e.g., DER-331, DER-332, and DER-334) or DEN (e.g., DEN-431 and DEN-428) from Dow Chemical Company, Midland, Mich.

Exemplary urea-formaldehyde resins and melamine-formaldehyde resins include those commercially available under the trade designation UFORMITE (e.g., from Reichhold Chemical, Durham, N.C.); DURITE (from Borden Chemical Company, Columbus, Ohio); and RESIMENE (e.g., from Monsanto, St. Louis, Mo.).

The nonwoven abrasive member may be manufactured through well-known conventional processes that include steps such as, for example, applying a curable binder precursor material (hereinafter referred to as "binder precursor") and abrasive particles to a lofty open nonwoven fiber web followed by curing the binder precursor. The abrasive particles may be applied in combination with the binder precursor as a slurry, or more desirably the abrasive particles may be applied (e.g., by dropping, blowing, or spraying) to the binder precursor after it is coated onto the lofty open nonwoven fiber web. The binder precursor typically comprises a thermosetting resin and an effective amount of a curative for the thermosetting resin. The binder precursor may also include various other additives such as, for example, fillers, plasticizers, surfactants, lubricants, colorants (e.g., pigments), bactericides, fungicides, grinding aids, and antistatic agents.

One exemplary method of making nonwoven abrasive members suitable for use in practice of the present disclosure includes sequentially: applying a pre-bond coating to a nonwoven fiber web (e.g., by roll-coating or spray coating), curing the pre-bond coating, impregnating the pre-bonded nonwoven fiber web with a binder precursor (e.g., by roll-coating or spray coating), and curing the curable composition.

Typically, the binder precursor (including any solvent and abrasive particles that may be present) is coated onto the nonwoven fiber web in an amount of from 125 grams per square meter (gsm) to 2080 gsm, more typically 500-2000 gsm, and even more typically 1250-1760 gsm, although values outside these ranges may also be used.

The binder precursor is typically applied to the fiber web in liquid form (e.g., by conventional methods), and subsequently hardened (e.g., at least partially cured) to form a layer coated on at least a portion of the fiber web. Binder precursors utilized in practice according to the present disclosure may typically be cured by exposure to, for example, thermal energy (e.g., by direct heating, induction heating, and/or by exposure to microwave and/or infrared electromagnetic radiation) and/or actinic radiation (e.g., ultraviolet light, visible light, particulate radiation). Exemplary sources of thermal energy include ovens, heated rolls, and/or infrared lamps.

In one exemplary method, a slurry coat precursor comprising abrasive particles and a binder precursor material is applied to the fiber web and then at least partially cured. Optionally, a second binder precursor material (i.e., a size coat precursor), which may be the same as or different from the slurry coat precursor may be applied to the slurry coat, typically after at least partially curing the slurry coat precursor.

In another exemplary method, a make coat precursor comprising a first binder precursor is typically applied to the fiber web, abrasive particles are deposited on the make coat, and then the make coat precursor is hardened (e.g., by evaporation, cooling, and/or at least partially curing). Subsequently, a second binder precursor (i.e., a size coat precursor), which may be the same as or different from the make coat precursor, may typically applied over the make coat and abrasive particles, and then at least partially cured.

Typically, binder precursors employed in slurry coat precursors, or at least one of make coat precursors and/or size coat precursors (e.g., as described above), comprise a monomeric or polymeric material that may be at least partially cured (i.e., polymerized and/or crosslinked). Typically, upon at least partial curing, such binder precursors form a non-elastomeric binder (e.g., a hard brittle binder) that may have a Knoop hardness number (KHN, expressed in kilogram-force per square millimeter (kgf/mm$^2$)) of, for example, at least about 20, at least about 40, at least about 50, or even at least about 60, as measured in accordance with ASTM Test Method D1474-98(2002) "Standard Test Methods for Indentation Hardness of Organic Coatings") that bonds abrasive particles to the fiber web.

Suitable methods for applying slurry coat precursors, make coat precursors, size coat precursors, etc. are well known in the art of nonwoven abrasive articles, and include coating methods such as curtain coating, roll coating, spray coating, and the like. Typically, spray coating is an effective and economical method for applying slurry coat and make coat precursors. The optional size coat may be elastomeric or non-elastomeric and may contain various additives such as, for example, one or more of a lubricant and/or a grinding aid. The optional size coat may comprise an elastomer (e.g., a polyurethane elastomer). Exemplary useful elastomers include those known for use as a size coat for nonwoven abrasive articles. For example, elastomers may be derived from isocyanate-terminated urethane pre-polymers such as, for example, those commercially available under the trade designations VIBRATHANE or ADIPRENE from Crompton & Knowles Corporation, Middlebury, Conn.; and MONDUR or DESMODUR from Bayer Corporation, Pittsburgh, Pa.

Optionally, the slurry coat, make coat, and/or size coat may further include one or more catalysts and/or curing agents to initiate and/or accelerate the curing process (e.g., thermal catalyst, hardener, crosslinker, photocatalyst, thermal initiator, and/or photoinitiator) as well as in addition, or alternatively, other known additives such as, for example, fillers, thickeners, tougheners, grinding aids, pigments, fibers, tackifiers, lubricants, wetting agents, surfactants, antifoaming agents, dyes, coupling agents, plasticizers, and/or suspending agents. Exemplary lubricants include metal stearate salts such as lithium stearate and zinc stearate, or materials such as molybdenum disulfide, and mixtures thereof.

As used herein, the term "grinding aid" refers to a non-abrasive (e.g., having a Mohs hardness of less than 7) particulate material that has a significant effect on the chemical and physical processes of abrading. In general, the addition of a grinding aid increases the useful life of a nonwoven abrasive. Exemplary grinding aids include inorganic and organic materials, include waxes, organic halides (e.g., chlorinated waxes, polyvinyl chloride), halide salts (e.g., sodium chloride, potassium cryolite, cryolite, ammonium cryolite, potassium tetrafluoroborate, sodium tetrafluoroborate, silicon fluorides, potassium chloride, magnesium chloride), metals (e.g., tin, lead, bismuth, cobalt, antimony, cadmium, iron, and titanium and their alloys), sulfur, organic sulfur compounds, metallic sulfides, graphite, and mixtures thereof.

Figure 8:
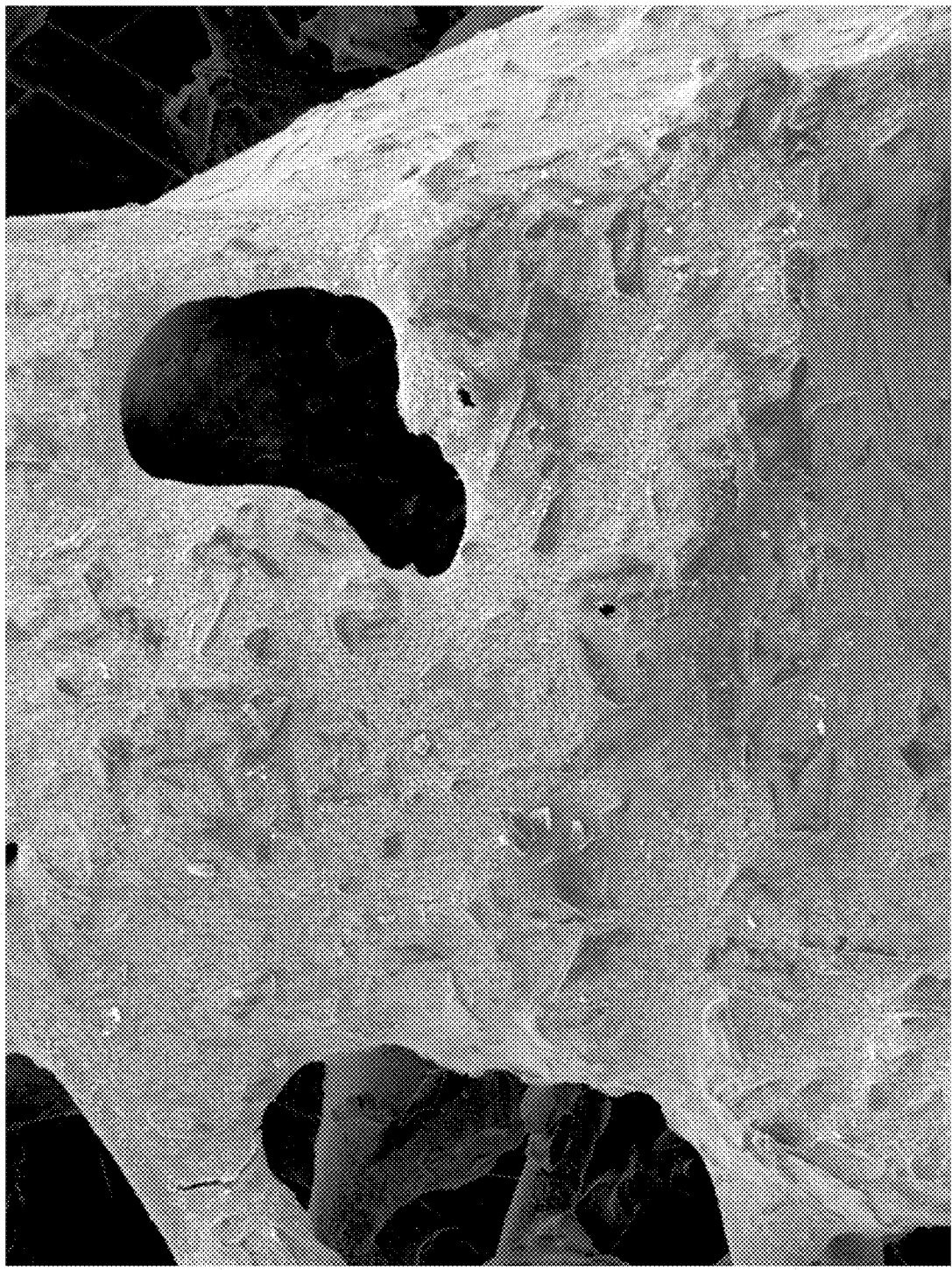
FIG. 8 is an SEM micrograph of the nonwoven abrasive member used in Example 5.
Figure 9:
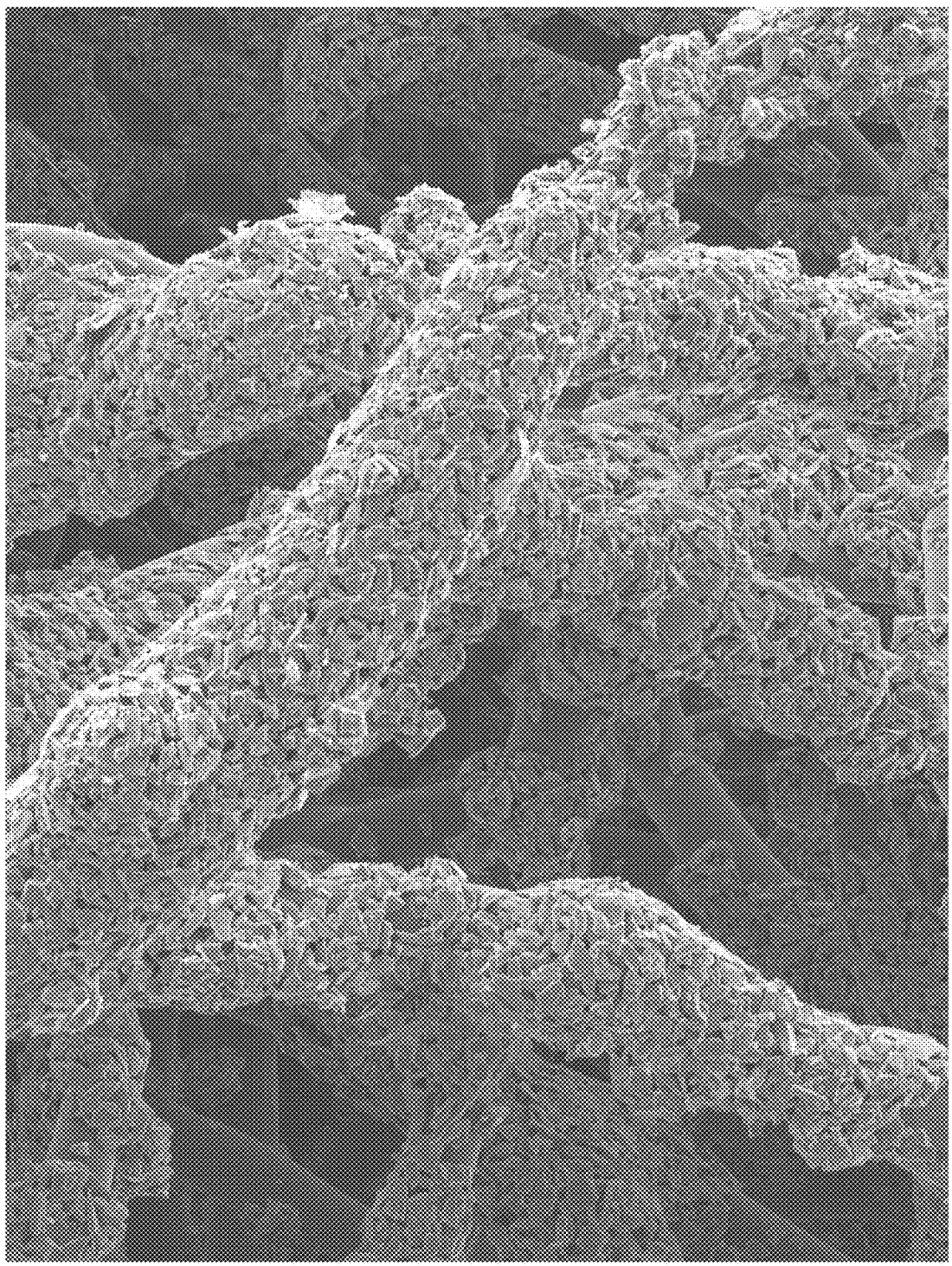
FIGS. 9-11 are SEM micrographs of the respective nonwoven abrasive members used in Examples 6-8.

In one useful embodiment, exposure of the abrasive particles through a plasma etching process results in nonwoven abrasive articles whose abrasive properties benefit by addition of an overlayer comprising a fatty acid metal salt. FIG. 8 shows an example of a plasma-etched nonwoven abrasive article. It can be seen that the visible outer layer of abrasive particles bound along the fibers are not deeply embedded (e.g., they are highly exposed).

During plasma etching, the ionized plasma erodes or removes the binder from the outer surfaces of the nonwoven abrasive member, gradually exposing more surface area of the underlying abrasive particles.

The conditions of the plasma treatment are adjusted for isotropic etching of the nonwoven abrasive member, uniformly eroding the cross-linked binder even though there are significant height and geometry variations within the nonwoven abrasive member.

Plasma etching apparatus and conditions are well-known in the art. Briefly, during plasma treatment, plasma created in a vacuum chamber from gas within the chamber is generated and sustained by supplying power (for example, from an RF generator operating at a frequency in the range of 0.001 to 100 MHz) to at least one electrode. The electrode system may be symmetric or asymmetric. In some plasma apparatus, electrode surface area ratios between grounded and powered electrodes are from 2:1 to 4:1 or from 3:1 to 4:1. The powered electrode may be cooled, e.g., with water. For discrete, relatively planar objects such as abrasive articles, plasma deposition can be achieved, for example, by placing the articles in direct contact with the smaller electrode of an asymmetric electrode configuration. This allows the article to act as an electrode due to capacitive coupling between the powered electrode and the article.

The RF power source provides power at a typical frequency in the range of 0.01 to 50 MHz, or 13.56 MHz or any whole number (e.g., 1, 2, or 3) multiple thereof. The RF power source can be an RF generator such as a 13.56 MHz oscillator. To obtain efficient power coupling (i.e., wherein the reflected power is a small fraction of the incident power), the power source may be connected to the electrode via a network that acts to match the impedance of the power supply with that of the transmission line (which is usually 50 ohms reactive) so as to effectively transmit RF power through a coaxial transmission line. One type of matching network, which includes two variable capacitors and an inductor, is available under the designation AMN 3000 from Plasmatherm of St. Petersburg, Fla. Traditional methods of power coupling involve the use of a blocking capacitor in the impedance matching network between the powered electrode and the power supply. This blocking capacitor prevents the DC bias voltage from being shunted out to the rest of the electrical circuitry. Instead, the DC bias voltage is shunted out in a grounded electrode. While the acceptable frequency range from the RF power source may be high enough to form a large negative DC self bias on the smaller electrode, it should not be so high that it creates standing waves in the resulting plasma, which is inefficient for plasma treatment.

In addition to batch treatment of the abrasive articles, rolls or continuous webs of nonwoven abrasive material can be treated using a continuous plasma reactor using techniques as described in U.S. Pat. No. 5,888,594 (David et al.); U.S. Pat. No. 5,948,166 (David et al.); U.S. Pat. No. 7,195,360 (Bacon et al.); and in U.S. Patent Appln. Publ. No. 2003/0134515 A1 (David et al.). A continuous plasma treatment apparatus typically includes a rotating drum electrode which may be powered by a radio frequency (RF) power source, a grounded chamber which acts as a grounded electrode, a feed reel which continuously supplies to-be-treated articles in the form of a continuous moving web, and a take-up reel which collects the treated article. The feed and take up reels are optionally enclosed within the chamber, or can be operated outside of the chamber as long as a low-pressure plasma can be maintained within the chamber. If desired, a concentric grounded electrode can be added near the powered drum electrode for additional spacing control. An inlet supplies suitable treatment gases in vapor or liquid form to the chamber.

The nonwoven abrasive material is preferably uniformly plasma treated by using alone or in combination, higher gas pressures, longer treatment times, higher power settings, or fluorocarbon (e.g., perfluoropropane (i.e., $C_3F_8$)) gases in combination with oxygen (i.e., $O_2$) to provide isotropic plasma etching conditions. The isotropic plasma etching conditions can use either pure oxygen gas at higher pressures or a combination of $O_2$ and $C_3F_8$ gases at lower pressures. Treatment gas pressures are generally from 50 to 10,000 milliTorr (7 to 1300 Pa), or from 60 to 1,000 milliTorr (8 to 170 Pa), or from 250 to 550 milliTorr (33 to 73 Pa). Treatment times are generally from 2 minutes to 15 minutes, or from 4 minutes to 12 minutes, or from 5 minutes to 10 minutes, although this is not a requirement. Treatment gases include, for example, either pure oxygen or a mixture of oxygen and $C_3F_8$ gases. A ratio for the flow rate of the $C_3F_8$ gas divided by a total combined flow rate of the $C_3F_8$ gas and the $O_2$ gas is generally from 0.10 to 0.30 or from 0.15 to 0.25, and the total combined gas flow rates are typically 0.1 to 10 liters/minute. Treatment power for the plasma etching process is generally set at from 0.1 to 1.0 watts/cm$^2$ of the electrode area.

The nonwoven abrasive member may be in any suitable form. Examples include webs, discs, pads, belts, and/or sheets.

The overlayer composition includes at least one fatty acid metal salt (i.e., a salt of a metal and at least one fatty acid). Useful fatty acid metal salts include, for example, metal salts of carboxylic acids represented by the formula R—CO$_2$H wherein R represents an aliphatic group having at least 7 carbon atoms, preferably at least 11 carbon atoms, and more preferably at least 18 carbon atoms. In some embodiments, R is represented by the formula $CH_3(CH_2)_nCO_2H$ wherein n is an integer and is at least 7, preferably at least 9, at least 11, at least 13, at least 15, or even at least 17. Although there is no specific limitation on the types of fatty acids, metal salts of fatty acids staying solid in room temperature are typically preferred. Examples of saturated fatty acids that may be used include caprylic acid, capric acid, lauric acid, myristic acid, palmitic acid, stearic acid, arachidic acid, behenic acid, lignoceric acid, and montanic acid. Examples of unsaturated fatty acids include undecylenic acid, decenoic acid, sapienic acid, vaccenic acid, oleic acid, erucic acid, linoleic acid, α-linolenic acid, and arachidonic acid. Among them, preferred fatty acids are capric acid, lauric acid, myristic acid, palmitic acid, stearic acid, behenic acid, montanic acid, and undecylenic acid, and more preferably stearic acid, palmitic acid, myristic acid, lauric acid, behenic acid, and montanic acid.

Exemplary of metals included in the metal salt of the fatty acid include calcium, zinc, magnesium, aluminum, barium, lithium, sodium, potassium, calcium and silver. Preferred metals include calcium, zinc, lithium, and barium. Combinations of two or more metal salts of fatty acids may also be used. A plurality of different metal salts of fatty acids may enable wetting tension of the overlayer composition to be controlled.

A binder may be included in the overlayer composition. Suitable binders include, for example, alkyl cellulose resins (e.g., methyl cellulose and ethyl cellulose), acrylic resins, alkylamide resins, vinyl acetate resins, styrene-acrylonitrile resins, styrene-butadiene rubbers, butadiene rubbers, natural rubber, chloroprene rubbers and methylbutadiene rubbers. Two or more binding resins may be used in combination.

The overlayer composition may optionally further comprise additives such as, for example, surface-active agents, plasticizers, antistatic agents, humidifying agents, antifoaming agents, coloring materials, pigments, filler, and combinations thereof.

The overlayer composition may be prepared by mixing a fatty acid metal salt and a binder, optionally in the presence of a liquid medium (e.g., water and/or a suitable organic solvent), if desired.

The content of the metal salt of the fatty acid in the overlayer composition for coating may be in a range of from 10 to 100 weight percent on a dry weight basis, more typically from 60 to 100 percent, although other amounts may be used.

The abrasive particles are distributed within the nonwoven abrasive member, but have a visible outer layer adjacent to at least one major surface of the lofty open fiber web. The overlayer composition is disposed on at least a portion of the visible outer layer of abrasive particles. While the overlayer composition may cover more abrasive particles, in general it is only the outer abrasive particles that contact a surface of a workpiece to be abraded, and hence the greatest benefit is seen when they are contacted by the overlayer composition.

The overlayer composition may be applied to only a portion of the major surface of the nonwoven abrasive member; for example, so as not to cover some of the abrasive particles adjacent to major surfaces of the lofty open fiber web, or it may be applied to the major surface. The overlayer may be applied before or after the abrasive member coatings are finally cured.

There is no specific limitation on how to apply the overlayer composition to the major surface(s) nonwoven abrasive member. For example, it may be applied by means of brush coating, roll coating, flow coating, die coating, spray coating and the like onto the abrasive surface (i.e., a surface which exerts abrasive action by contacting a workpiece). The quantity of overlayer composition to be applied onto the abrasive surface can vary in an appropriate manner with the size and quantity of abrasive particles to be used and the intended application of the abrasive article. Generally, it is approximately 1 to 200 gsm as dried coating weight, and preferably approximately 9 to 40 gsm, although other dried coating weights may also be used.

After the overlayer composition is applied onto the abrasive surface, it may be heated and dried under proper conditions of temperature and time until the binding resin is formed into a film. The heating conditions may be determined in an appropriate manner.

Nonwoven abrasive articles according to the present disclosure are useful for abrading a workpiece. One such method includes frictionally contacting a nonwoven abrasive article with a surface of the workpiece, and moving at least one of the nonwoven abrasive article or the workpiece relative to the other to abrade at least a portion of the surface. Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Nonwoven abrasive articles according to the present disclosure may be used by hand and/or used in combination with a machine. Abrading may be conducted under wet or dry conditions. Exemplary liquids for wet abrading include water, water containing conventional rust inhibiting compounds, lubricant, oil, soap, and cutting fluid. The liquid may also contain, for example, defoamers, and/or degreasers.

Further details concerning nonwoven abrasive articles, abrasive wheels and methods for their manufacture may be found, for example, in U.S. Pat. No. 2,958,593 (Hoover et al.); U.S. Pat. No. 5,591,239 (Larson et al.); U.S. Pat. No. 6,017,831 (Beardsley et al.); and U.S. Patent Appln. Publ. No. 2006/0041065 A1 (Barber).

SELECT EMBODIMENTS OF THE PRESENT DISCLOSURE

In a first embodiment, the present disclosure provides a nonwoven abrasive article comprising:
a) a nonwoven abrasive member having a working surface, wherein the nonwoven abrasive member comprises:
a lofty open fiber web comprising fibers bonded to one another;
abrasive particles adhered to at least a portion of the fibers by a binder material, wherein at least a portion of the abrasive particles form a visible outer layer of the abrasive particles along the fibers adjacent to the working surface of the nonwoven abrasive member, wherein the abrasive particles in the visible outer layer are closely packed, and wherein on a numerical basis at least 80 percent of the abrasive particles in the visible outer layer have recognizable outlines; and
b) an overlayer composition disposed on at least a portion of the visible outer layer of the abrasive particles thereby forming the nonwoven abrasive article, wherein the overlayer composition comprises a fatty acid metal salt.

In a second embodiment, the present disclosure provides a nonwoven abrasive article according to the first embodiment, wherein the visible outer layer of the abrasive particles comprises crevices disposed between adjacent ones of the abrasive particles.

In a third embodiment, the present disclosure provides a nonwoven abrasive article according to the first or second embodiment, wherein at least a portion of the abrasive particles in the visible outer layer of the abrasive particles overlap one another.

In a fourth embodiment, the present disclosure provides a nonwoven abrasive article according to any one of the first to third embodiments, wherein the overlayer composition has a basis weight of at least 2.5 grams per square meter.

In a fifth embodiment, the present disclosure provides a nonwoven abrasive article according to any one of the first to fourth embodiments, wherein the overlayer composition further comprises a polymeric resin.

In a sixth embodiment, the present disclosure provides a nonwoven abrasive article according to any one of the first to fifth embodiments, wherein the abrasive particles have an average particle size of at least 5 microns.

In a seventh embodiment, the present disclosure provides a nonwoven abrasive article according to any one of the first to sixth embodiments, wherein the abrasive particles conform to an abrasives industry specified nominal grade.

In an eighth embodiment, the present disclosure provides a method of making an abrasive article, the method comprising:
a) providing a nonwoven abrasive member having a working surface, wherein the nonwoven abrasive member comprises:
   a lofty open fiber web comprising fibers bonded to one another;
   abrasive particles adhered to at least a portion of the fibers by a binder material, wherein at least a portion of the abrasive particles form a visible outer layer of the abrasive particles along the fibers adjacent to the working surface of the nonwoven abrasive member, wherein the abrasive particles in the visible outer layer are closely packed, and wherein on a numerical basis at least 80 percent of the abrasive particles in the visible outer layer have recognizable outlines; and
b) disposing an overlayer composition on at least a portion of the visible outer layer of the abrasive particles thereby forming the nonwoven abrasive article, wherein the overlayer composition comprises a fatty acid metal salt.

In a ninth embodiment, the present disclosure provides a nonwoven abrasive article according to the eighth embodiment, wherein the visible outer layer of the abrasive particles comprises crevices disposed between adjacent ones of the abrasive particles.

In a tenth embodiment, the present disclosure provides a nonwoven abrasive article according to the seventh or eighth embodiment, wherein at least a portion of the abrasive particles in the visible outer layer of the abrasive particles overlap one another.

In an eleventh embodiment, the present disclosure provides a method according to any one of the eighth to tenth embodiments, wherein the overlayer composition has a basis weight of at least 2.5 grams per square meter.

In a twelfth embodiment, the present disclosure provides a nonwoven abrasive article having a working surface, wherein the nonwoven abrasive member comprises:
   a lofty open fiber web comprising fibers bonded to one another; and
   abrasive particles adhered to the fibers by a binder material, wherein the working surface of the nonwoven abrasive member has a kinetic coefficient of friction of at least 0.54 according to the FRICTION TEST described herein; and
   an overlayer composition disposed on at least a portion of the binder material and abrasive particles adjacent to the working surface thereby forming the nonwoven abrasive article, wherein the overlayer composition comprises a fatty acid metal salt.

In a thirteenth embodiment, the present disclosure provides a nonwoven abrasive article according to the twelfth embodiment, wherein the overlayer composition has a basis weight of at least 2.5 grams per square meter.

In a fourteenth embodiment, the present disclosure provides a nonwoven abrasive article according to the twelfth or thirteenth embodiment, wherein the overlayer composition further comprises a polymeric resin.

In a fifteenth embodiment, the present disclosure provides a nonwoven abrasive article according to any one of the twelfth to fourteenth embodiments, wherein the abrasive particles have an average particle size of at least 5 microns.

In a sixteenth embodiment, the present disclosure provides a nonwoven abrasive article according to any one of the twelfth to fifteenth embodiments, wherein the abrasive particles have an average particle size of less than or equal to 125 microns.

In a seventeenth embodiment, the present disclosure provides a nonwoven abrasive article according to any one of the twelfth to sixteenth embodiments, wherein the abrasive particles conform to an abrasives industry specified nominal grade.

In an eighteenth embodiment, the present disclosure provides a method of making an abrasive article, the method comprising:
   providing a nonwoven abrasive member having a working surface, wherein the nonwoven abrasive member comprises:
      a lofty open fiber web comprising fibers bonded to one another;
      abrasive particles adhered to the fibers by a binder material, wherein the working surface of the nonwoven abrasive member has a kinetic coefficient of friction of at least 0.54 according to the FRICTION TEST described herein; and
   disposing an overlayer composition on at least a portion of the binder material and the abrasive particles adjacent to the working surface thereby forming the nonwoven abrasive article, wherein the overlayer composition comprises a fatty acid metal salt.

In a nineteenth embodiment, the present disclosure provides a method according to the eighteenth embodiment, wherein the overlayer composition has a basis weight of at least 2.5 grams per square meter.

In a twentieth embodiment, the present disclosure provides a method of making an abrasive article, the method comprising:
a) providing a nonwoven abrasive member having a working surface, wherein the nonwoven abrasive member comprises:
   a lofty open fiber web comprising fibers bonded to one another; and
   abrasive particles adhered to at least a portion of the fibers by a binder material, wherein at least a portion of the abrasive particles are at least partially embedded in the binder material; and
b) plasma-etching a portion of the binder material adjacent to the working surface to expose portions of the abrasive particles previously embedded in the binder material to provide a plasma-etched nonwoven abrasive member; and
c) disposing an overlayer composition on at least a portion of the working surface of the plasma-etched nonwoven abrasive member, wherein the overlayer composition comprises a fatty acid metal salt.

In a twenty-first embodiment, the present disclosure provides a method according to the twentieth embodiment, wherein the abrasive particles have an average particle size of less than or equal to 125 microns.

In a twenty-second embodiment, the present disclosure provides a method according to the twentieth or twenty-first embodiment, wherein the overlayer composition has a basis weight of at least 2.5 grams per square meter.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Abbreviations for materials used in the Examples are reported in Table 1, below.

TABLE 1

| ABBREVIATION | DESCRIPTION |
| --- | --- |
| Fiber | 15 denier (17 dTex) × 1.5 inches (3.8 cm) staple length High Tenacity Nylon 66 fiber produced by EMS CHEMIE, Austria |
| water | tap water |
| PMA | propylene glycol monomethyl ether acetate, obtained from Ashland Chemical Co., Columbus, Ohio |
| K450 | LAPOX K-450 aromatic amine hardener diluted to 42.3 weight percent in PMA, from Royce International, East Rutherford, New Jersey. |
| BL16 | polyurethane prepolymer, obtained as ADIPRENE BL-16 from Chemtura Corporation, Middlebury, Connecticut |
| GEO | anti-foam agent, obtained as GEO FM LTX from GEO Specialty Chemicals, Ambler, Pennsylvania |
| P1 | red pigment, aqueous dispersion, obtained as RPD-0210 from Sun Chemical Corporation, Cincinnati, Ohio |
| PME | propylene glycol monomethyl ether, obtained from Dow Chemical Corporation, Midland, Michigan |
| SR | 75% hydroxyethyl ethylene urea in Water, obtained as SR511A from Sartomer Inc., Exton, Pennsylvania |
| S1 | ethoxylated nonionic surfactant, obtained as DYNOL 604 from Air Products and Chemicals Inc., Allentown, Pennsylvania |
| S2 | secondary alcohol ethoxylate, nonionic surfactant, obtained as TERGITOL 15-S-5 from Dow Chemical Company |
| Resin | phenolic resin obtained as PREFERE 80 5077A from Arclin, Mississauga, Ontario, Canada |
| AP280 | DURALUM G52 brown aluminum oxide abrasive particles, grade 280/600, from Washington Mills Electro Minerals Corp., Niagara Falls, New York |
| P2 | carbon black pigment, obtained as C-SERIES BLACK 7 LCD4115 from Sun Chemical Corporation, Cincinnati, Ohio |
| AP1500 | silicon carbide, black, grade P1500, obtained from GNP Ceramics LLC, Clarence Center, New York |
| L1 | a 1.52 wt. % dispersion of LAPONITE synthetic clay (Southern Clay Products, Inc. Gonzales, Texas) in a mixture of 84.4 wt. % of water, 14.07 wt. % PME and 0.01 wt. % GEO |
| CaSt | calcium stearate solution, consisting of 67-68 wt. % of water, 28.8 wt. % of C14-18 calcium stearate, 3.2 wt. % of polyacrylate emulsion and 0.5-1.0 wt. % ammonium salt of modified polymer. |
| LiSt | lithium stearate solution consisting of 79.5 wt. % water, 18 wt. % C14-18 lithium stearate, 2 wt. % polystyrene-acrylate emulsion (obtained as JONCRYL 89 from BASF, Florham Park, New Jersey), and 0.5 wt. % sodium lauryl sulfate |
| NaSt | Sodium stearate solution consisting of 80.05 wt. % water, 18 wt. % C14-18 sodium stearate, 1.45 wt. % polystyrene-acrylate emulsion (obtained as JONCRYL 89 from BASF), 0.25 wt. % sodium lauryl sulfate and 0.25% METHOCEL (from Dow Chemical. |
| NaSt1 | Sodium stearate solution consisting of 84.5 wt. % water, 15 wt. % C14-18 sodium stearate, 0.25 wt. % sodium lauryl sulfate and 0.25% METHOCEL from Dow Chemical. |
| CaSt1 | Calcium stearate solution consisting of 84.5 wt. % water, 15 wt. % C14-18 calcium stearate, 0.25 wt. % sodium lauryl sulfate and 0.25 wt. % METHOCEL cellulose ether from Dow Chemical. |
| BaSt | Barium stearate solution (30 wt. % in water) obtained as EC1686 from eChem Ltd, Leeds, UK. |
| P3 | Black dye solution containing 45 wt. % of PME, 45 wt. % of water and 10 wt. % of ELCACID NIGROSINE WSJ black dye obtained from Greenville Colorants, LLC, East Jersey City, New Jersey |
| P4 | Red dye solution consisting of 89.2 wt. % of PME, 4.1 wt. % of P3, and 6.7 wt. % of DISPERSE RED 17 obtained from American Dyestuff Corp., Clifton, New Jersey. |

Test Procedures

Schiefer Test

Two nonwoven abrasive article test specimens were prepared as 10.2-cm diameter discs that are stacked and then secured to a foam back-up pad by means of a hook-and-loop fastener. The back-up pad/fastener assembly had a Shore Durometer OO hardness of 85. The abrasive disc and back-up pad assembly was installed on a Schiefer Uniform Abrasion Tester (available from Frazier Precision Instrument Company, Inc. Hagerstown, Md.), and the abrasive disc was used to abrade an annular ring (10.2 cm outside diameter (OD)×5.1 cm inside diameter (ID)) of cellulose acetate butyrate polymer from Seelye-Eiler Plastics Inc., Bloomington, Minn. The load was 5 lb (2.27 kg). The test duration was 8 periods of 500 revolutions or cycles of the abrasive disc (4000 cycles total). The amount of cellulose acetate butyrate polymer removed was measured at the end of each 500-cycle test period.

KCF Test

This procedure follows that of the FRICTION TEST with the following additional details. The friction testing machine was a Thwing-Albert Friction/Peel Tester Model 225-100, obtained from Thwing-Albert Instrument Company, West Berlin, N.J.

The friction testing machine was set for a 500-gram load, a 5-second test time, and a speed of 31 cm/min (speed setting "D"). The weighted test specimen was placed on the test surface and attached to the testing machine by a metal hook.

The test machine was zeroed and the test initiated. Three specimens were tested for each example.

Example 1

Nonwoven abrasive test specimens were prepared and tested both with and without an overlayer coating of CaSt.

A lightweight, open, low-density air-laid nonwoven web was prepared from Fiber using a RANDO-WEBBER machine, commercially available from the Rando Machine Corporation of Macedon, N.Y. The resulting lofty open fiber web had a nominal basis weight of 37 grains per 24 square inches (155 gsm), and the thickness was 0.35 inches (9 mm). The web was conveyed to a horizontal two-roll coater, where a pre-bond resin consisting of 74.89 wt. % of PMA, 5.53 wt. % of K450, 15.07 wt. % of BL16, 0.01 wt. % of GEO, and 4.5 wt. % of P4 was applied to the fiber web at a wet add-on weight of 7 grains/24 square inches (29.3 gsm).

The coated web was conveyed through an oven maintained at 163-177° C. with a residence time of 3 minutes. The resulting pre-bonded fiber web was conveyed to a spray booth where a resin/abrasive slurry consisting of 19.11 wt. % of L1, 0.40 wt. % of P1, 1.60 wt. % of SR, 0.10 wt. % of 51, 13.58 wt. % of Resin, 1.00 wt. % of S2, and 64.22 wt. % of AP280 was sprayed on the top surface of the web. Within the booth, spray nozzles (which are mounted to reciprocate perpendicularly to the direction of web movement) apply the slurry at a wet weight of about 67 grains/24 square inch (280 gsm).

Figure 2:
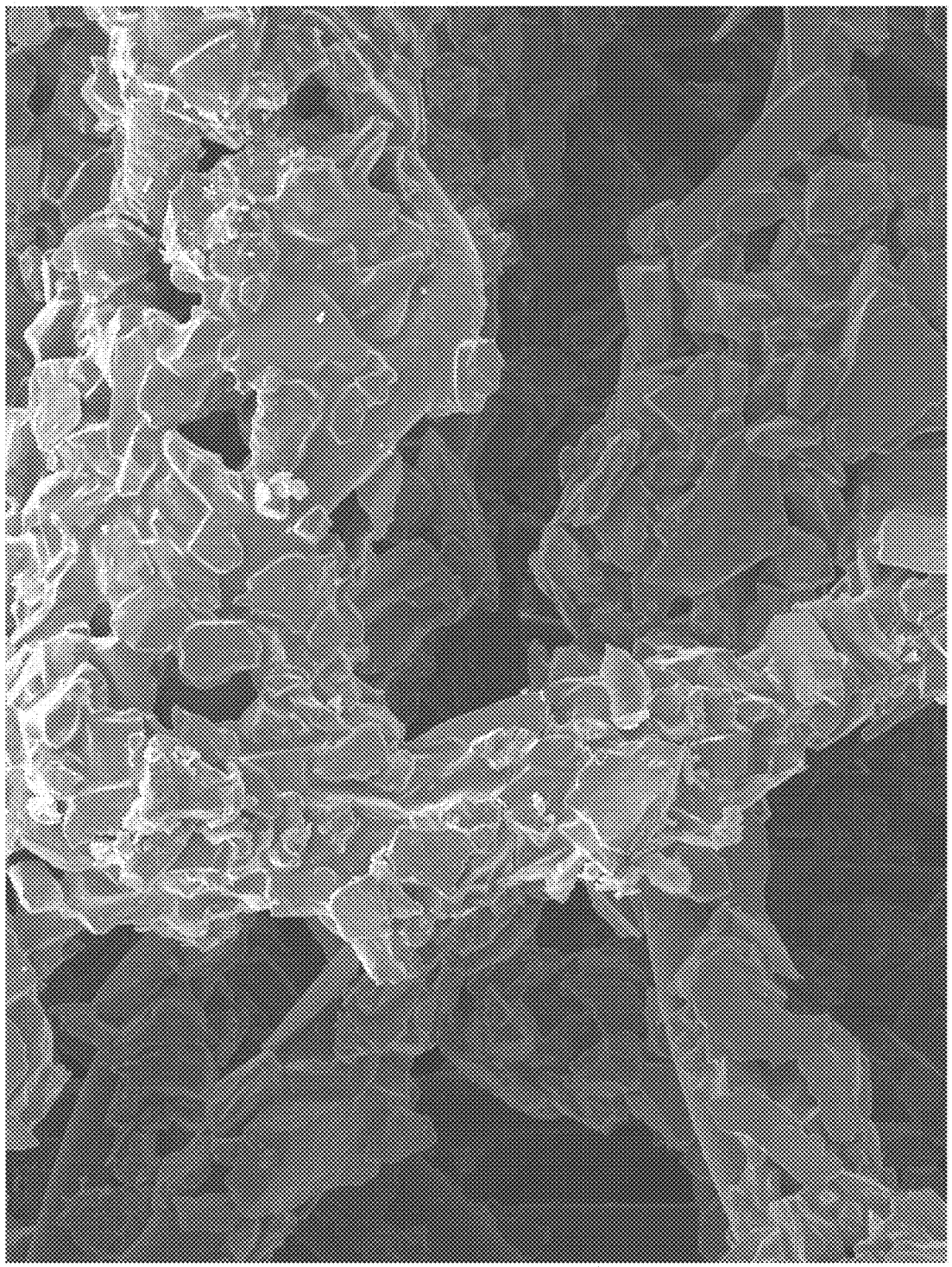
FIGS. 2 and 3 are Scanning Electron Microscope (SEM) micrographs of the nonwoven abrasive members used in Examples 1 and 2, respectively.

The slurry-coated web was then heated in an oven maintained at 177° C. for 3 minutes. The web was then inverted and the slurry spray coating was applied to the opposite side of the web. The coated web was finally heated in an oven maintained at 177° C. for 3 minutes, to yield a nonwoven abrasive member (shown in FIG. 2) which was tested according to the Schiefer Test and the KCF Test. Test results are reported in Table 2.

The nonwoven abrasive member was then brushed with a uniform coating of a 16 wt. % solids CaSt solution and heated in a forced convection oven maintained at 95° C. for 20 minutes to achieve a dry add-on of 18 grains/24 square inches (75 gsm). The resulting article was tested according to the Schiefer Test and the results reported in Table 2. The difference in the Schiefer Test results for the uncoated nonwoven abrasive article and the CaSt-coated nonwoven abrasive article are also reported in Table 2.

Examples 2-4 and Comparative Examples A-B

Figure 3:
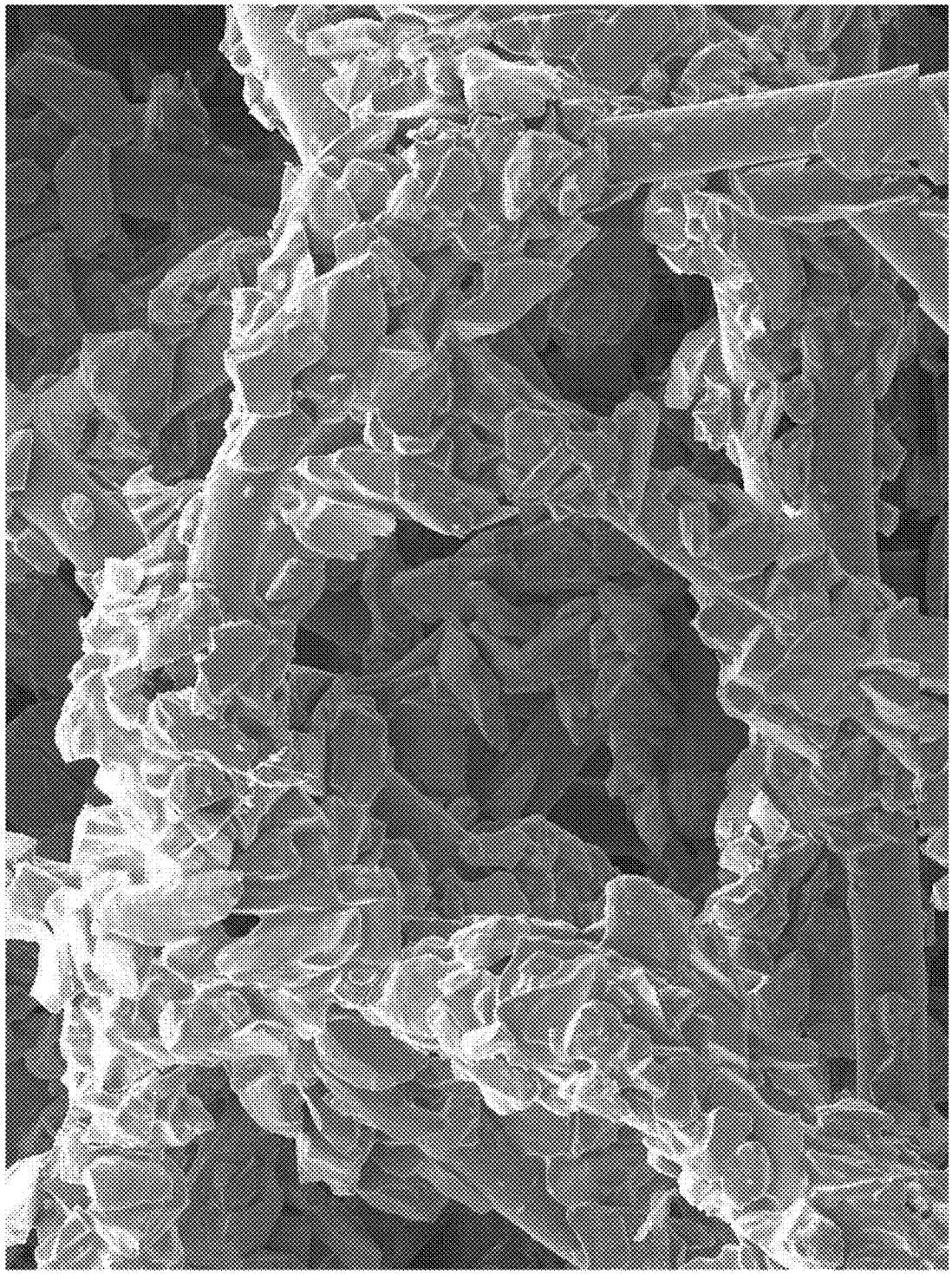
Figure 4:
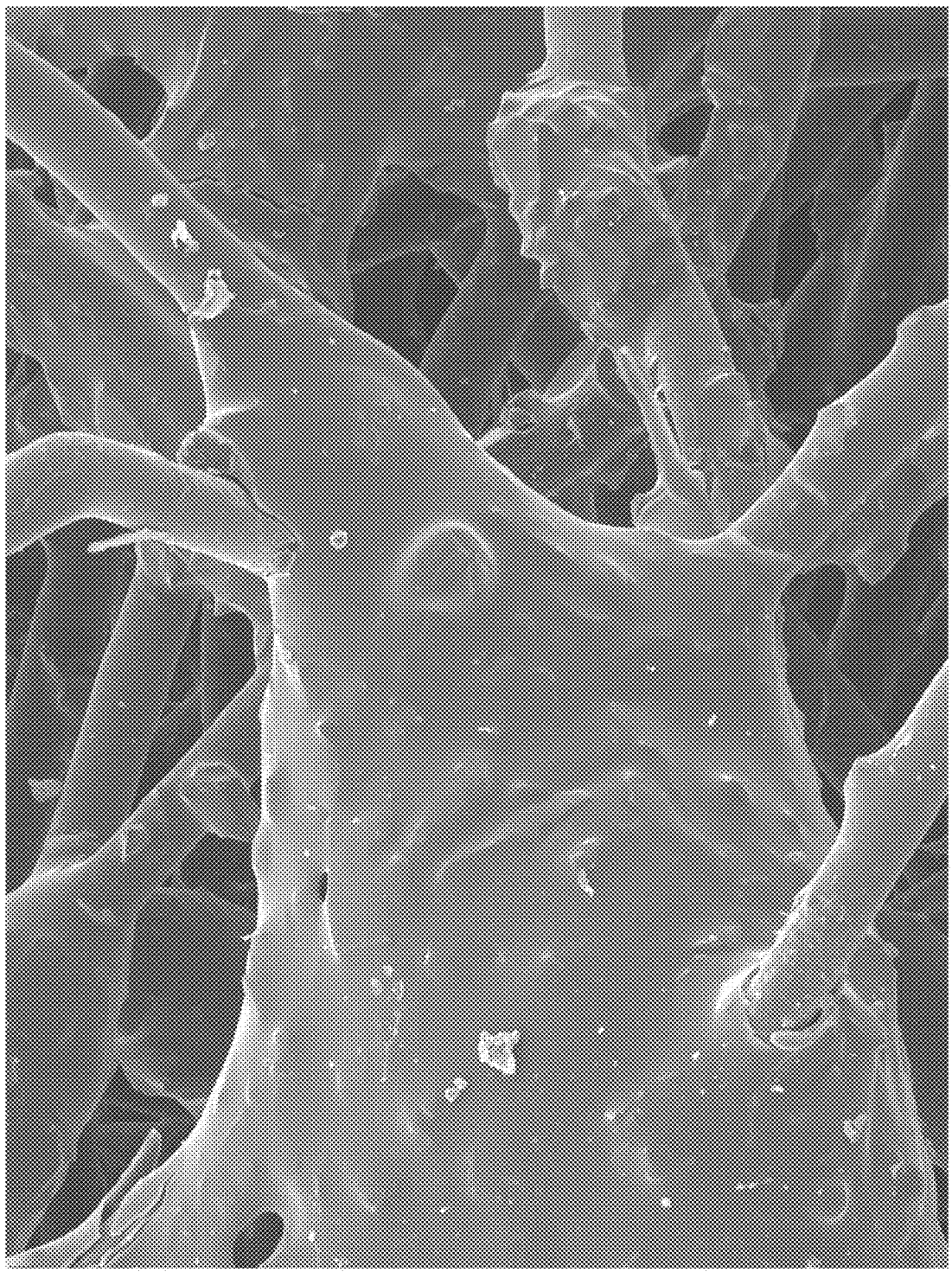
FIGS. 4 and 5 are SEM micrographs of the respective nonwoven abrasive members used in Comparative Examples A and B.
Figure 5:
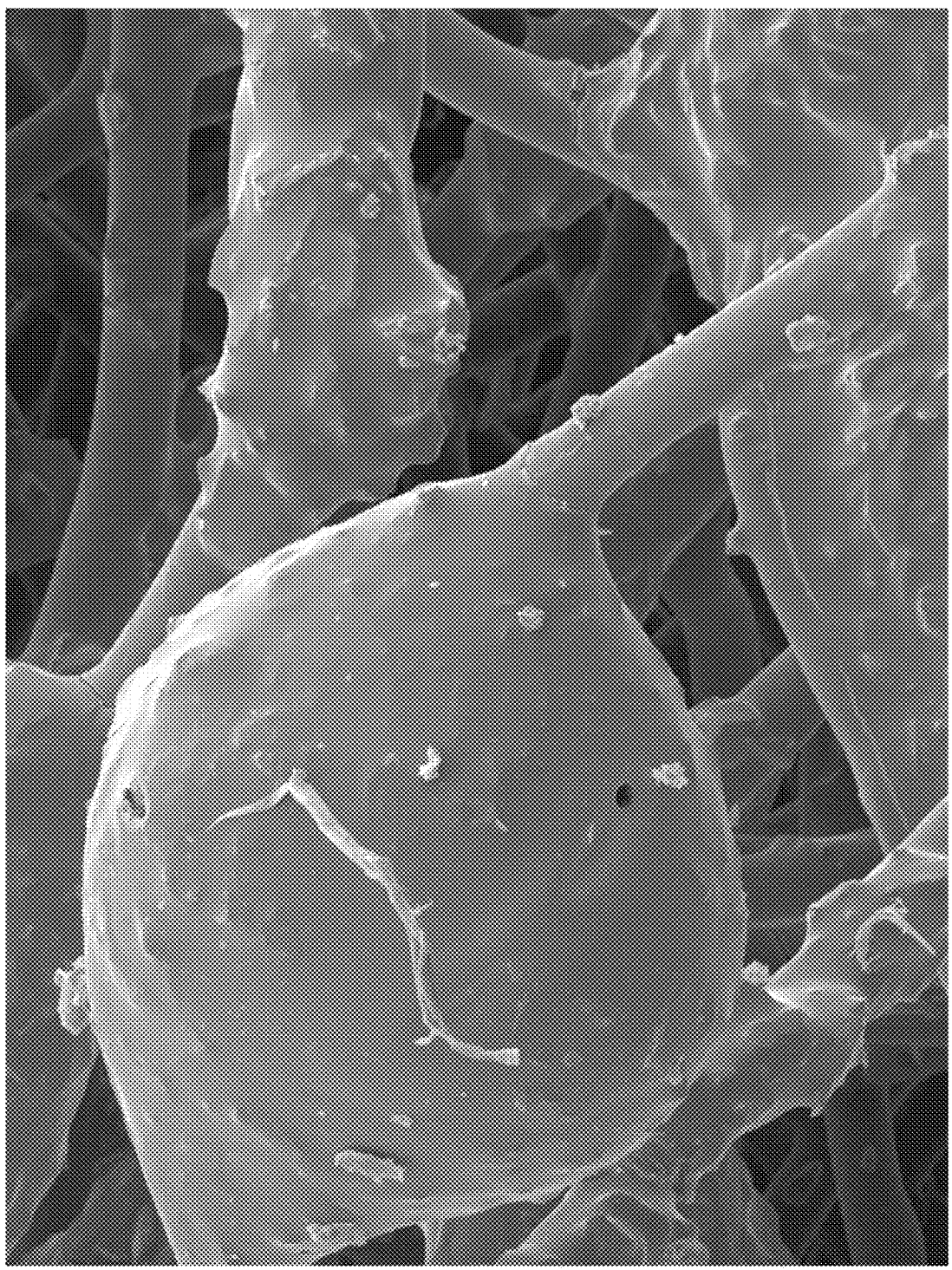

Example 2 and Comparative Examples A and B were further embodiments with alumina abrasive particles, and were made identically to Example 1, except that, in the case of Comparative Example A only, the prebond composition consisted of 53.21 wt. % of PMA, 17.94 wt. % of ten degree xylene, 7.74 wt. % K450, 21.1 wt. % BL16, and 0.01 wt. % GEO, and the slurry spray compositions were as reported in Table 3. The resulting nonwoven abrasive members were tested according to the Schiefer Test and the KCF Test. The CaSt solution was then applied as recited in Example 1 and the resulting nonwoven abrasive members (shown in respective FIGS. 3-5) were tested according to the Schiefer Test. Results are reported in Table 2.

Figure 6:
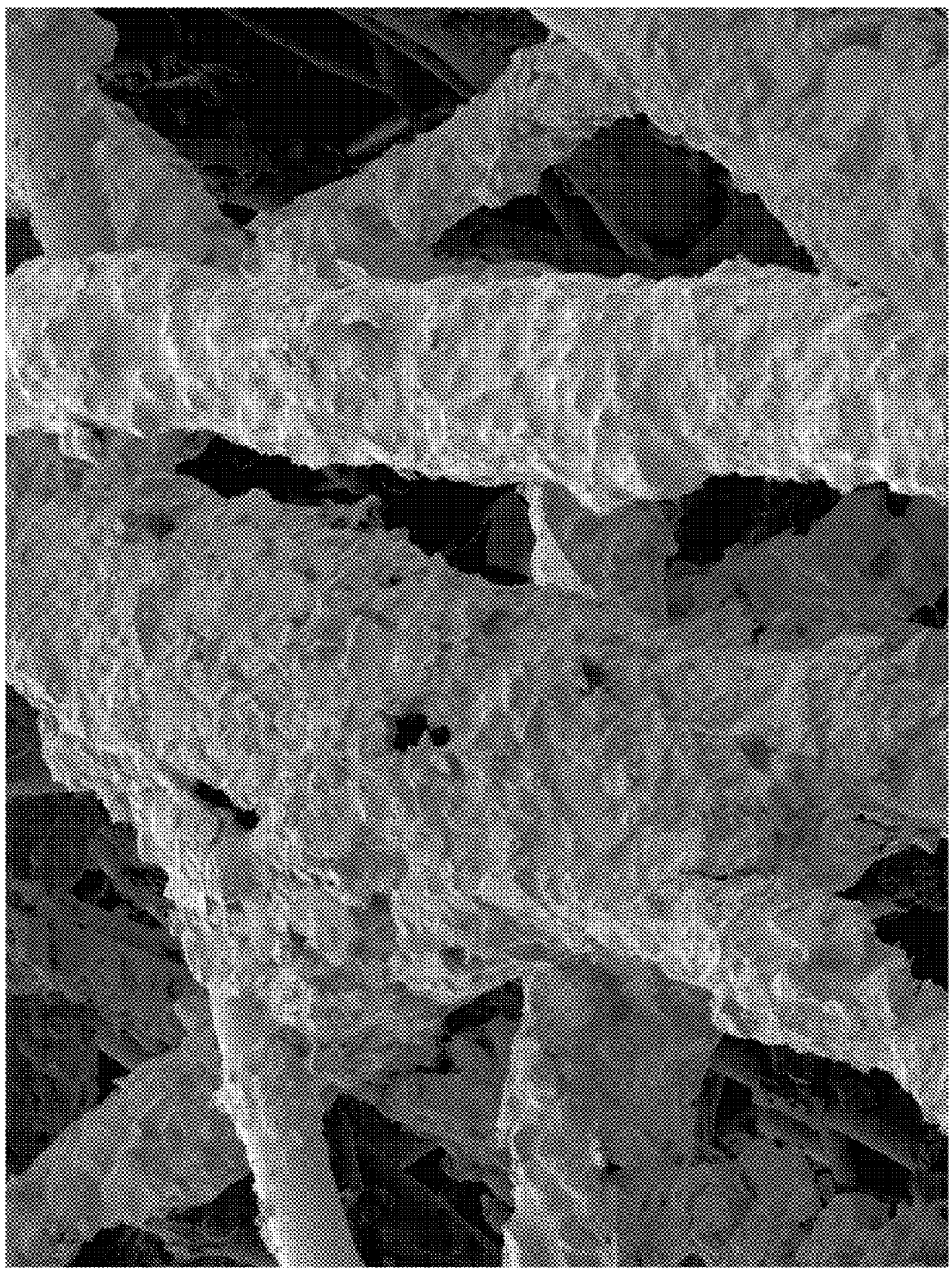
FIGS. 6-7 are SEM micrographs of the respective nonwoven abrasive members used in Examples 3 and 4.

Example 3 (shown in FIG. 6) was a MIRKA MIRLON 18-111-447 SCUFF PAD nonwoven abrasive handpad, obtained from Mirka Abrasives, Inc., Twinsburg, Ohio.

Figure 7:
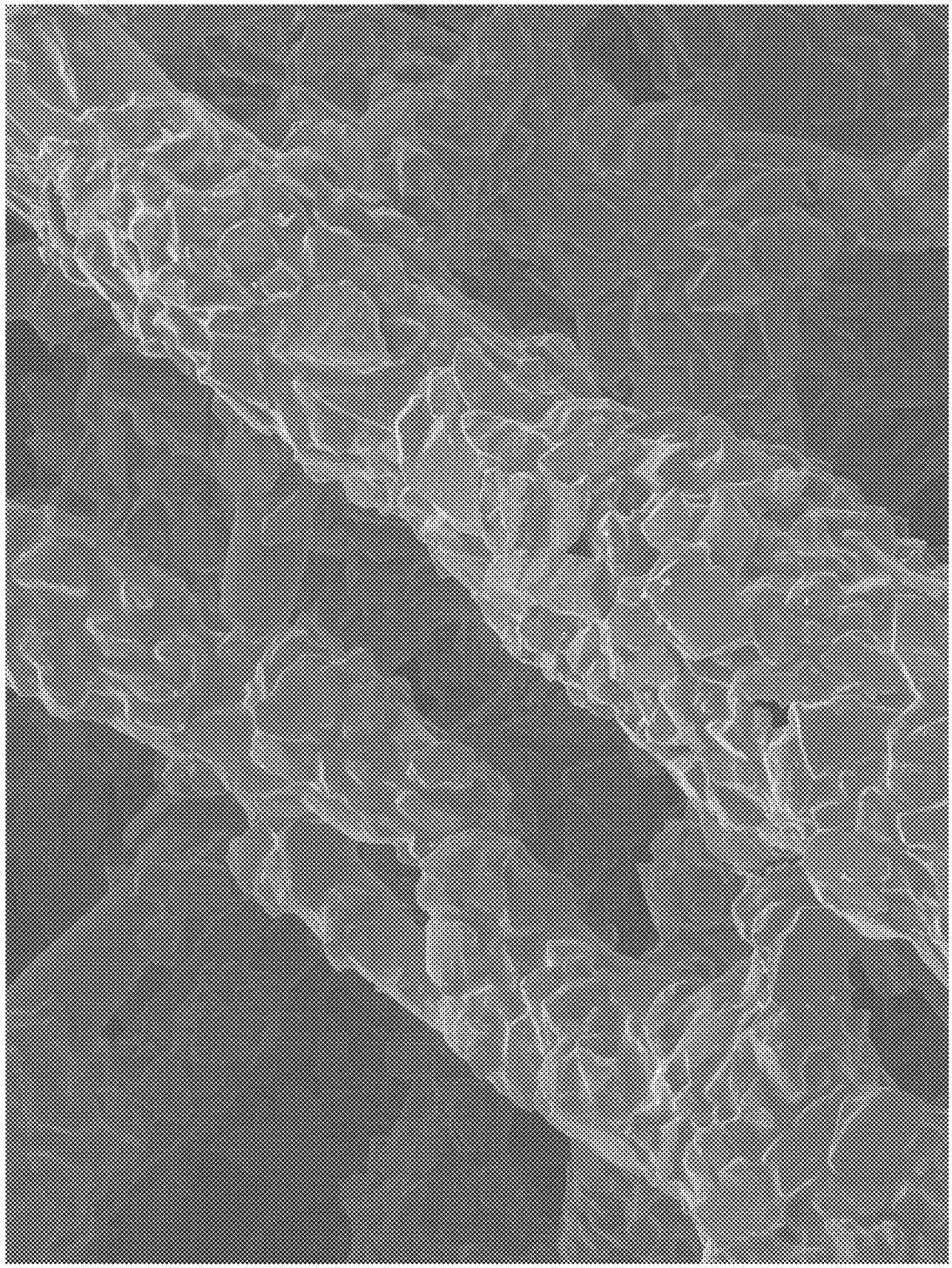

Example 4 (shown in FIG. 7) was a NORTON BEAR-TEX 74700 nonwoven abrasive hand pad, obtained from Saint-Gobain Abrasives Inc., Worcester, Mass.

Example 5

Example 5 was prepared to demonstrate the effect of particle exposure on the efficacy of the CaSt coating. Example 5 was made by exposing the nonwoven abrasive member of Comparative Example B to a plasma treatment process as described in Example 1 of U.S. Patent Appln. Publ. No. 2010/0255254 A1 (Culler et al.), with the exception that the treatment time was 20 minutes instead of 10 minutes. The kinetic coefficient of friction and the cut of Example 5 were then measured both with and without the CaSt coating, as in the previous Examples. The resulting nonwoven abrasive member is shown in FIG. 8, and the test results are reported in Table 2.

Examples 6-12 and Comparative Example C

Examples 6-8 and Comparative Example C were made identically to Example 1, except that the pre-bond composition was 78.98% PMA, 5.6% K450, 15.26% BL16, 0.01% GEO, and 0.151.16% P2; and the slurry spray compositions was that shown in Table 3. The resulting nonwoven abrasive members (shown in respective FIGS. 9-12) were tested according to the Schiefer Test and the KCF Test.

The CaSt solution was then applied as recited in Example 1, and the resulting nonwoven abrasive articles were tested according to the Schiefer Test. Results are reported in Table 2.

Figure 13:
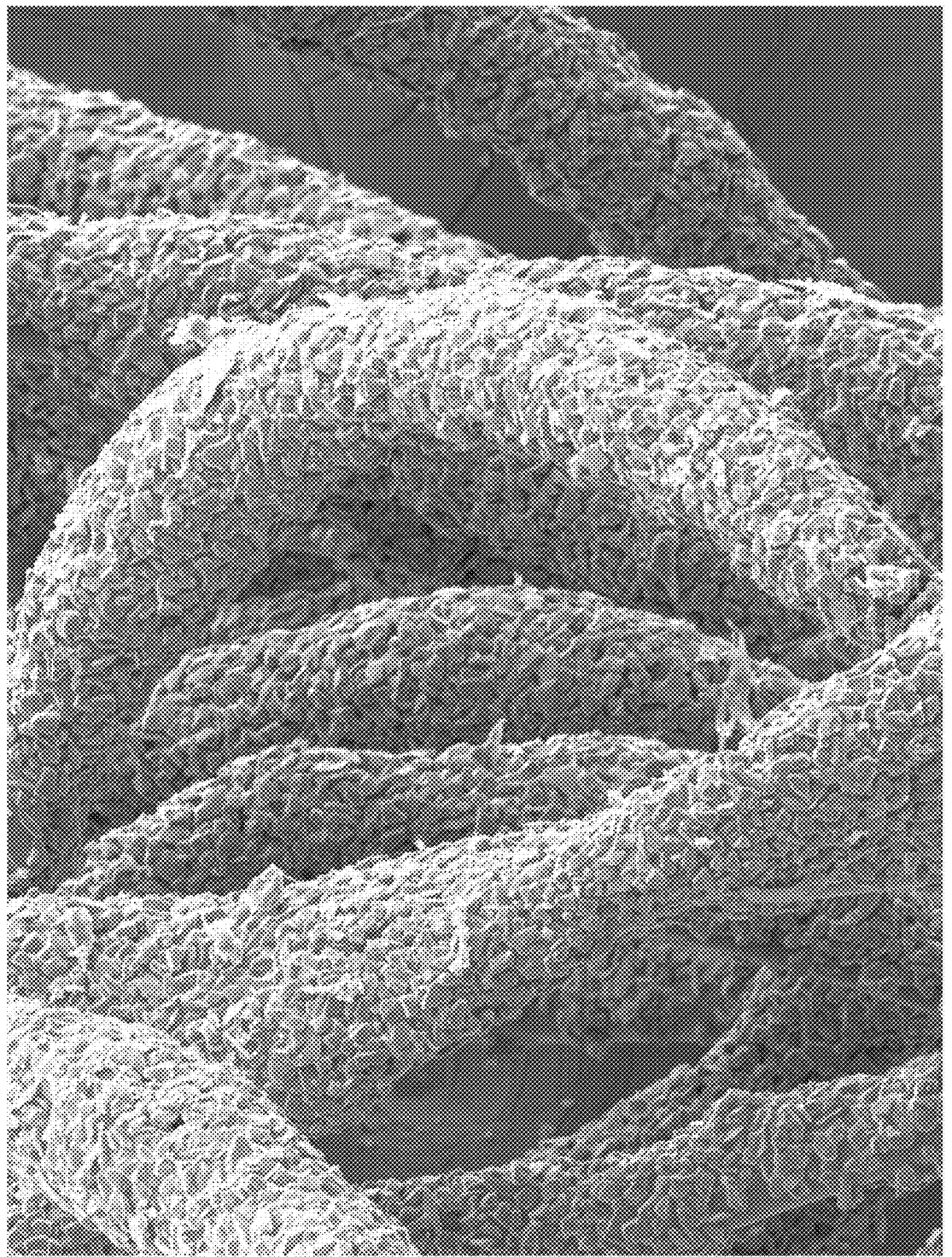
FIGS. 13-23 are SEM micrographs of the respective nonwoven abrasive members used in Examples 9-23.

Example 9 (shown in FIG. 13) was MIRKA MIRLON 18-111-448 SCUFF PAD nonwoven abrasive handpad, obtained from Mirka Abrasives, Inc.

Figure 14:
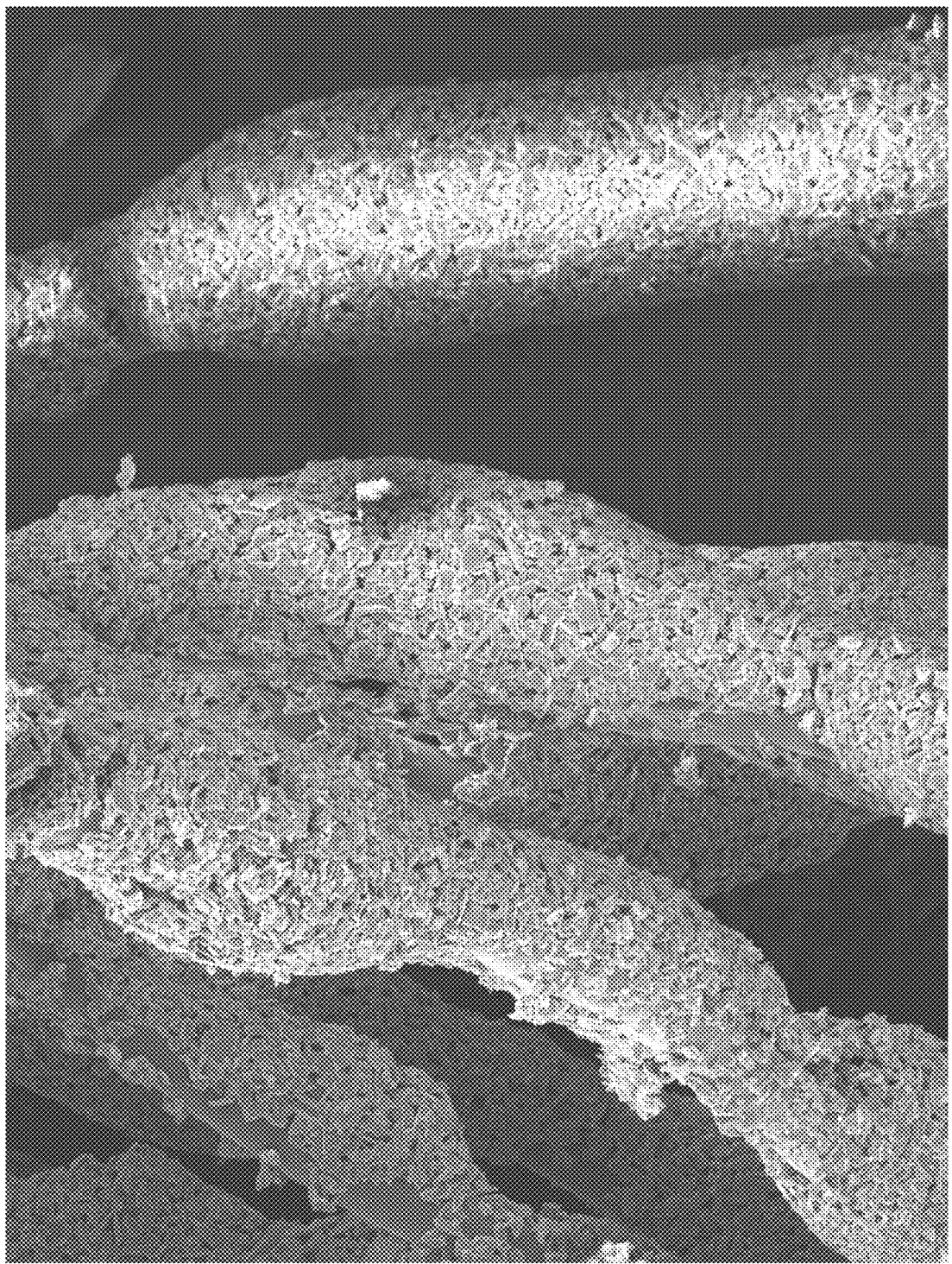

Example 10 (shown in FIG. 14) was a NORTON BEAR-TEX 74800 nonwoven abrasive hand pad, obtained from Saint-Gobain Abrasives Inc.

Example 11 (shown in FIG. 15) was a SCOTCH-BRITE DURABLE FLEX S ULF nonwoven abrasive hand pad from 3M Company, Saint Paul, Minn.

Figure 16:
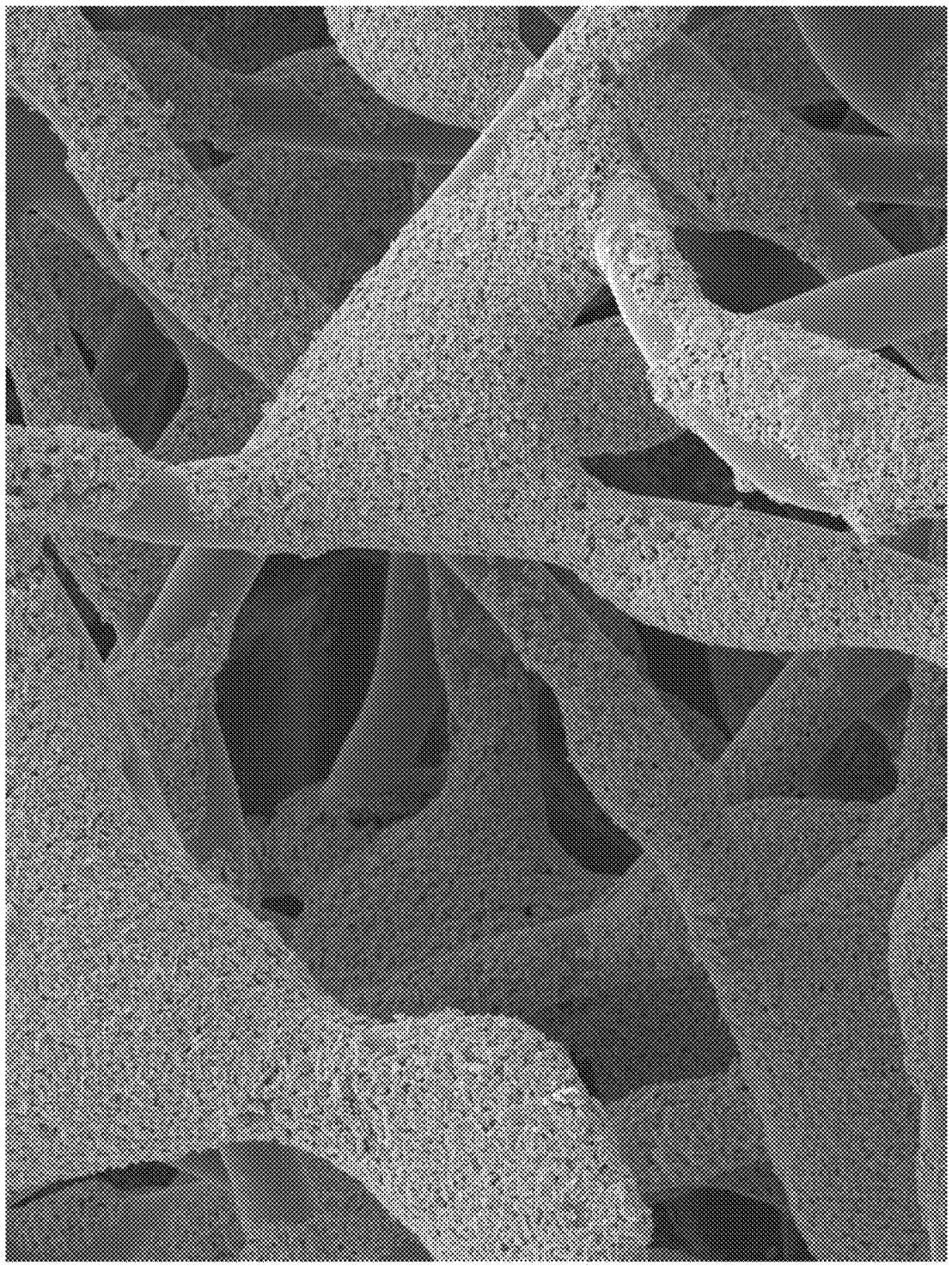
Figure 17:
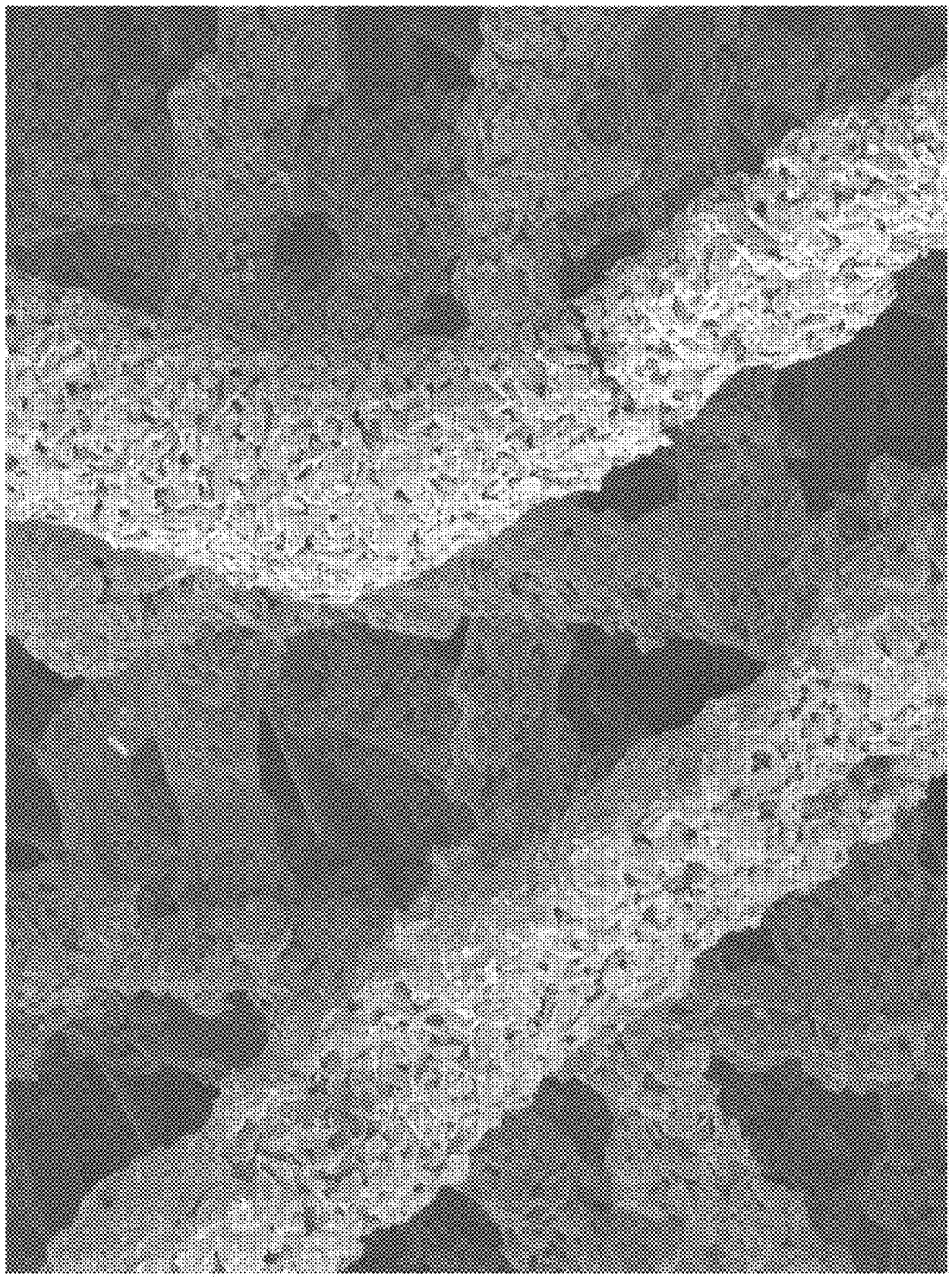
Figure 18:
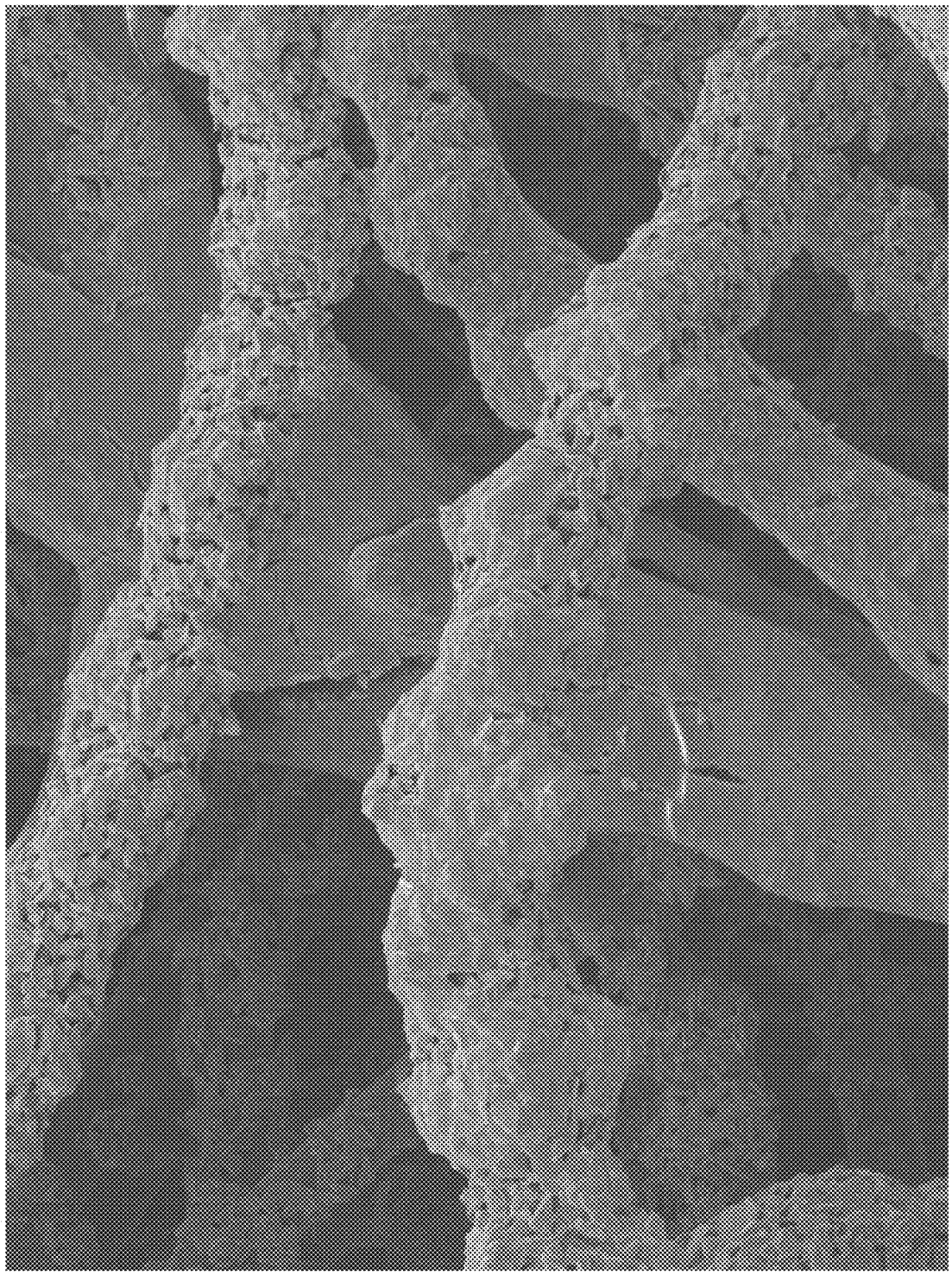
Figure 19:
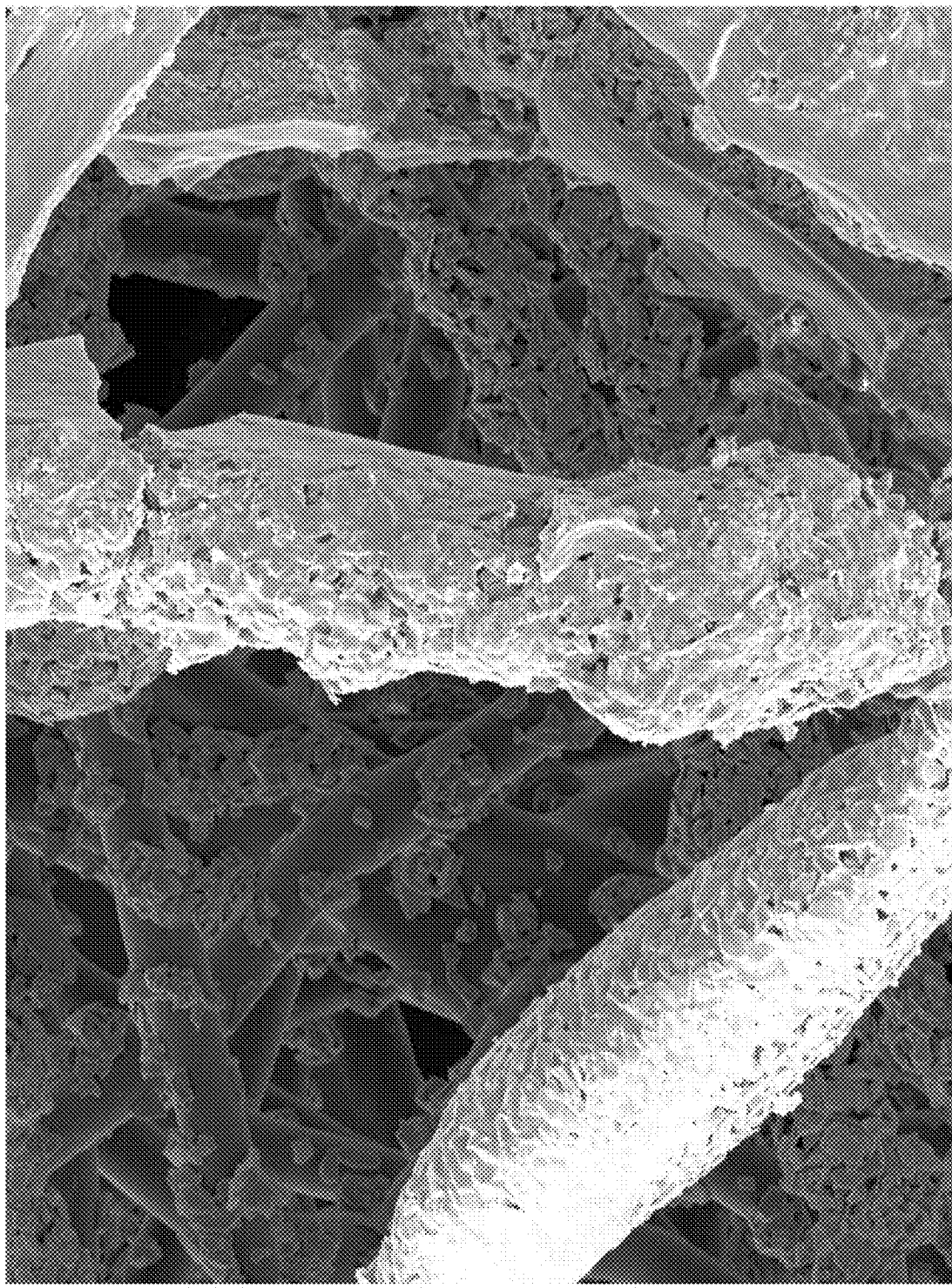
Figure 20:
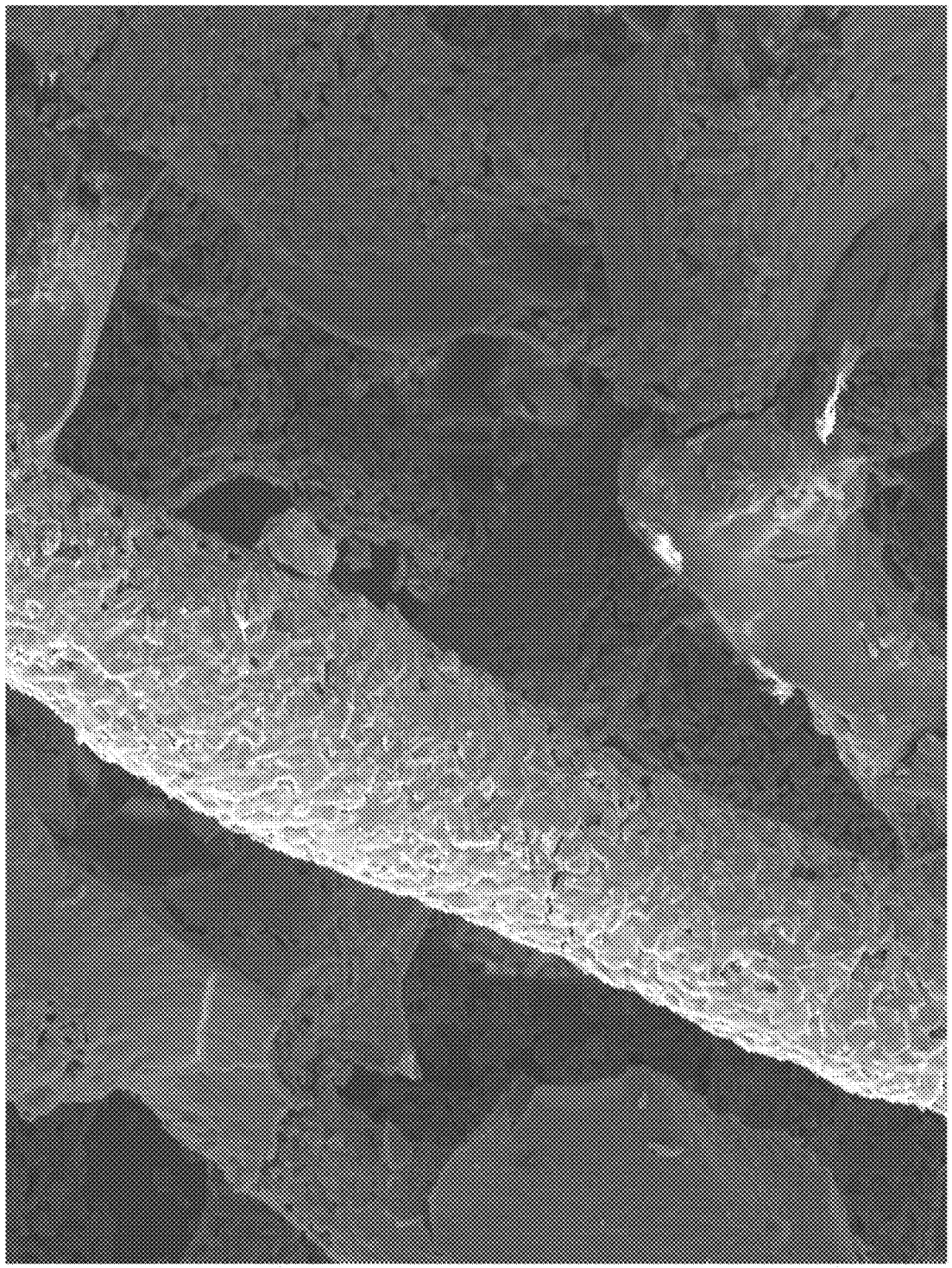
Figure 21:
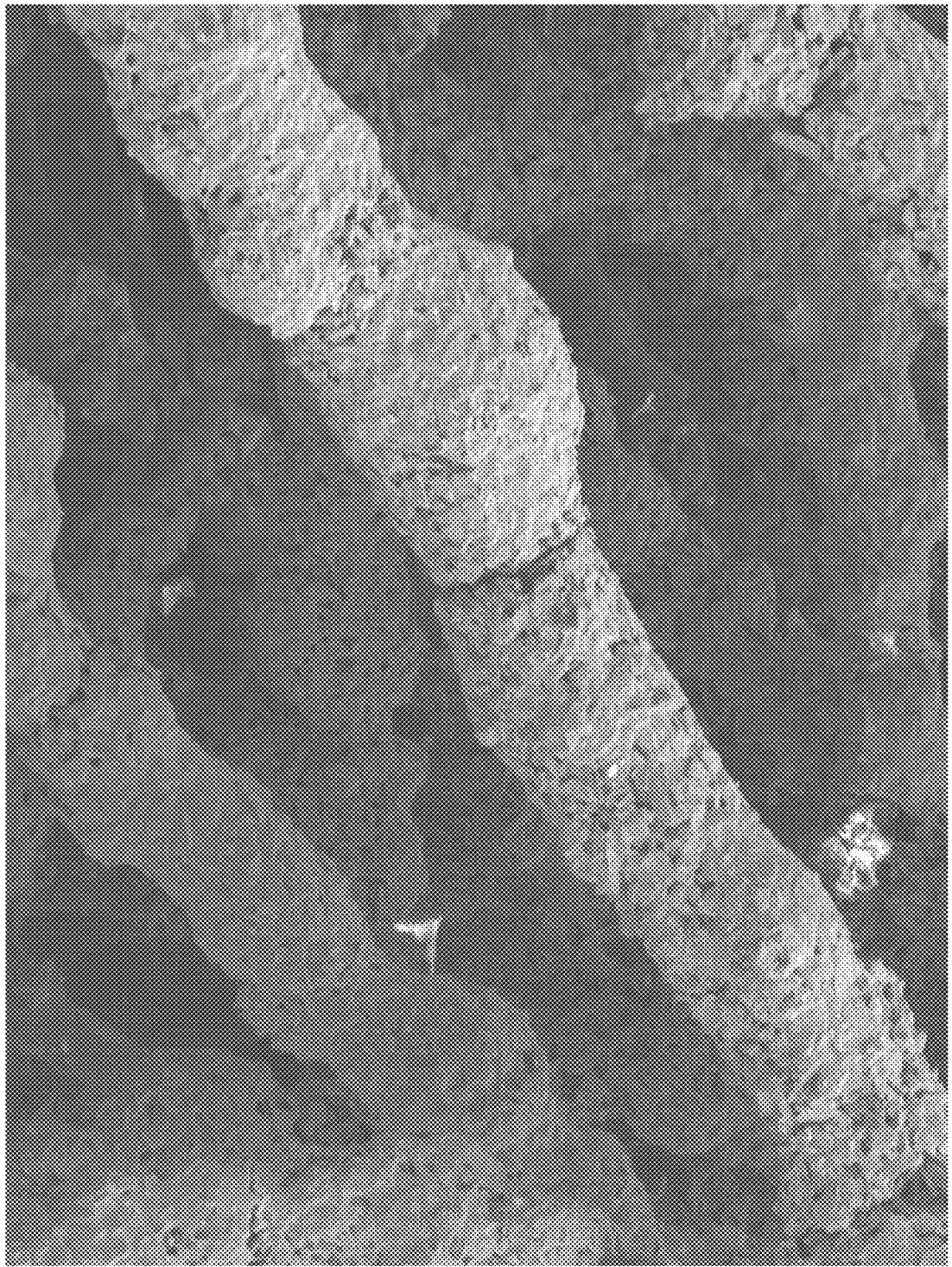
Figure 22:
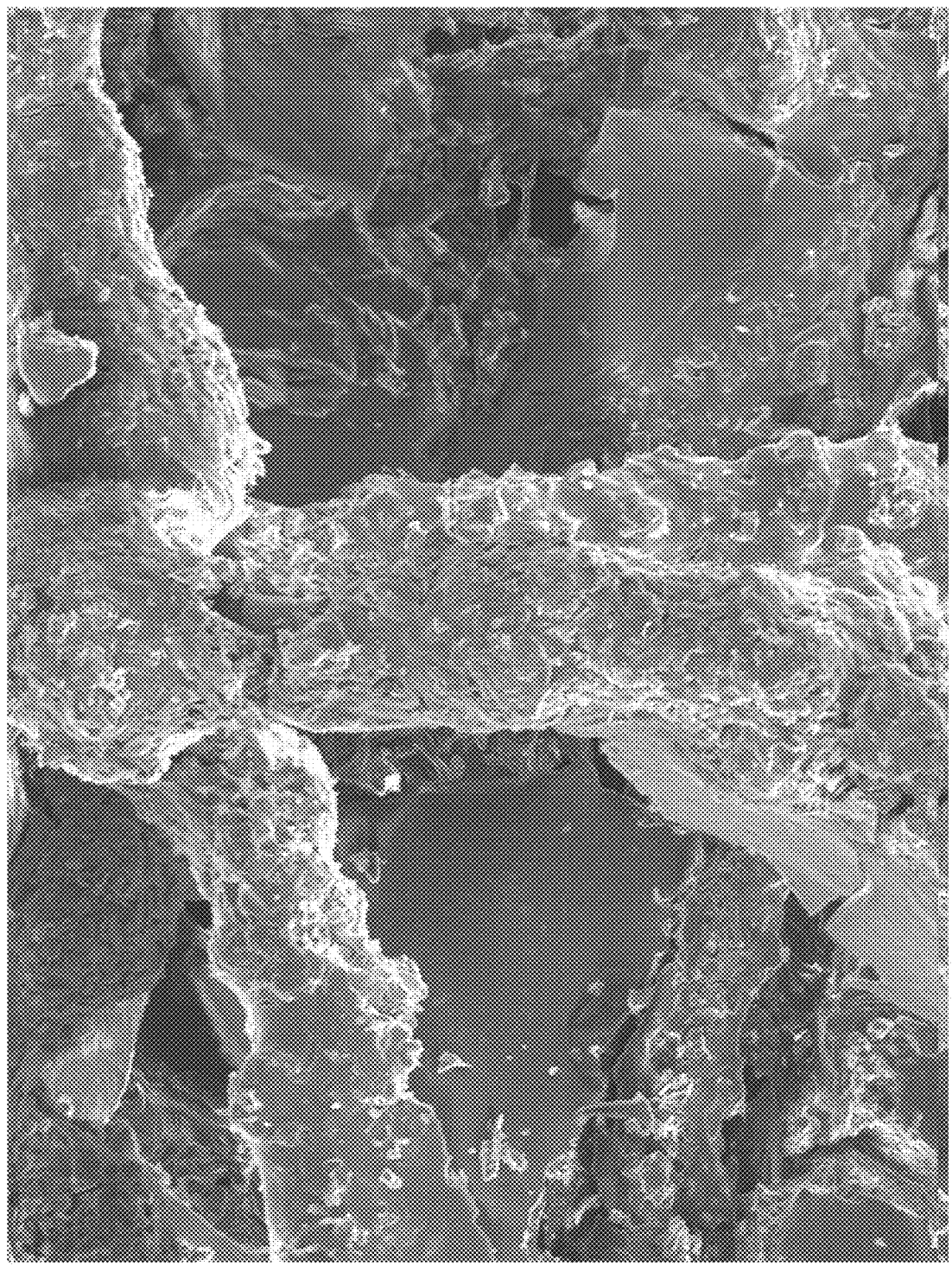
Figure 23:
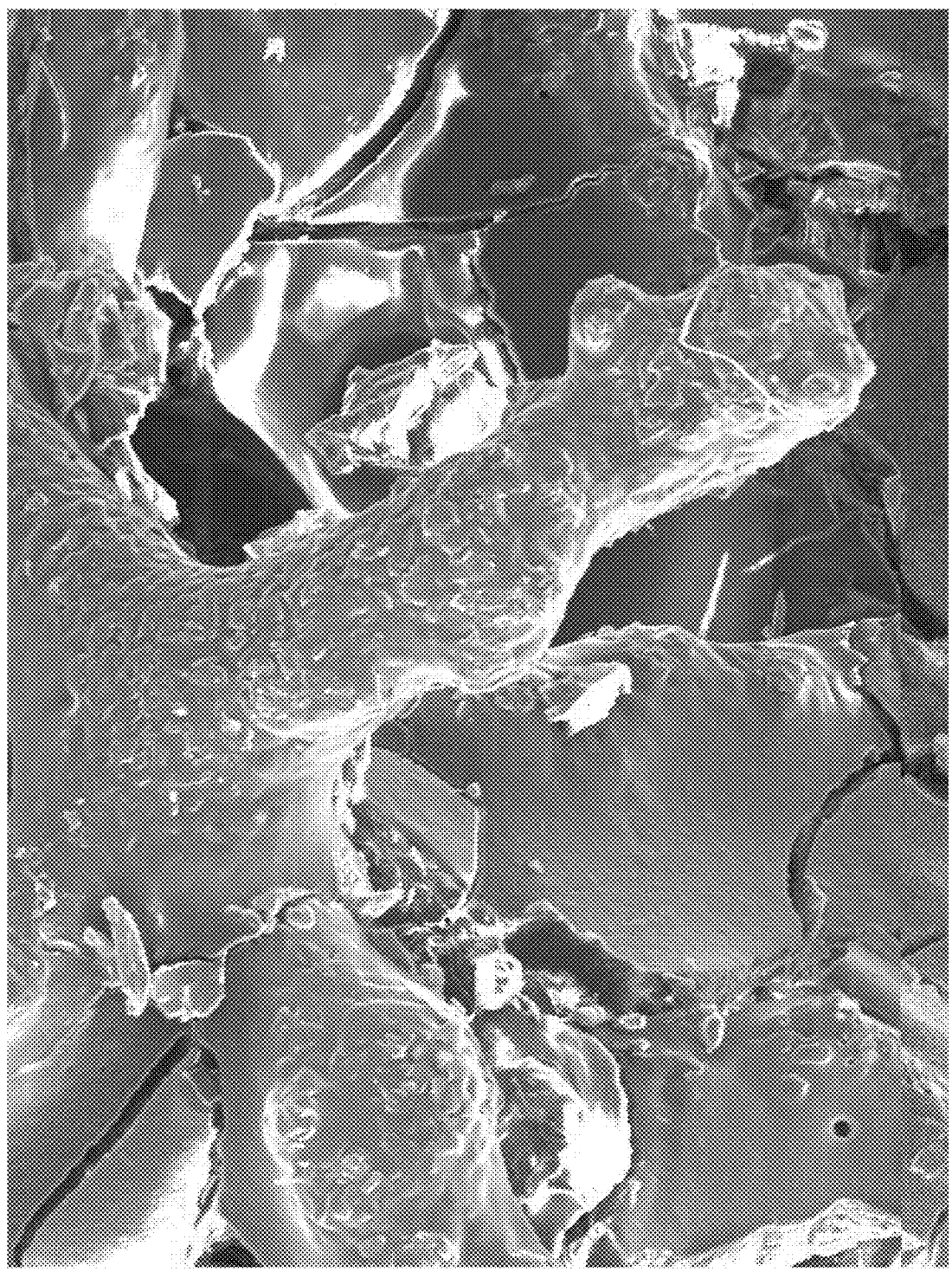
Figure 24:
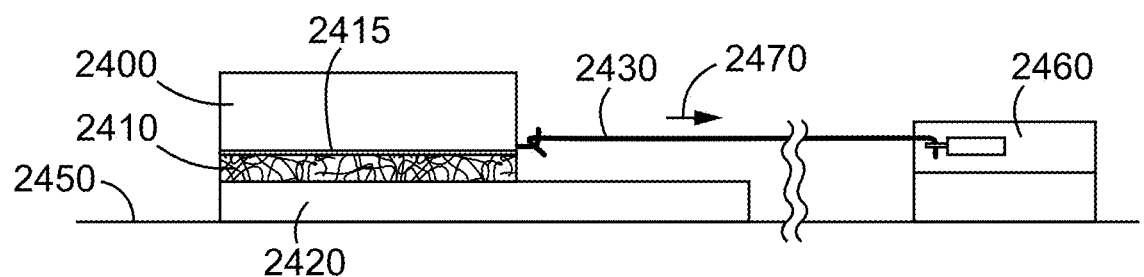
FIG. 24 is a schematic view of a configuration for carrying out the FRICTION TEST.

Example 12 (shown in FIG. 16) was a SCOTCH-BRITE 7448B nonwoven abrasive hand pad from 3M Company.

Examples 13-19

Examples 13-19 were prepared to show the effects of type of stearate at various add-ons, and were prepared identically to Example 7, with the exception that either CaSt or LiSt was applied topically according to the compositions reported in Table 4. Schiefer Test results for uncoated and variously coated examples are reported in Table 4. FIGS. 17-23 show the nonwoven abrasive members used in Examples 13-19, respectively.

Examples 20 and 21

Examples 17 and 18 were a repeat of Example 7, with the exception that a constant amount of two different metal salts was applied as reported in Table 4.

Examples 22-25

Examples-22-25 were prepared to show the effects of various metal stearate salts with the same add-on weight (18 gsm), and were prepared identically to Example 7, with the exception that either CaSt1, NaSt, NaSt1, or BaSt was applied topically according to the compositions reported in Table 5, and Examples 22 and 23 were prepared without a binder in the overlayer composition. Schiefer Test results for uncoated and variously coated examples are reported in Table 5.

TABLE 2

| EXAMPLE | KCF TEST | | SCHIEFER TEST CUT | | |
|---|---|---|---|---|---|
| | Kinetic Coefficient of Friction | Standard Deviation | No CaSt Overlayer, grams | With CaSt Overlayer, grams | % Change |
| Comparative Example A | 0.45 | 0.01 | 0.251 | 0.154 | −39 |
| Comparative Example B | 0.51 | 0.03 | 0.315 | 0.238 | −25 |
| 1 | 0.59 | 0.03 | 0.677 | 1.344 | +98.5 |
| 2 | 0.67 | 0.01 | 0.643 | 1.850 | +188 |
| 3 | 0.64 | 0.03 | 0.570 | 0.760 | +14 |
| 4 | 0.71 | 0.01 | 0.600 | 0.980 | +63 |
| 5 | 0.59 | 0.04 | 0.339 | 0.415 | +23 |
| 6 | 0.67 | 0.02 | 0.195 | 0.403 | +106 |
| 7 | 0.57 | 0.02 | 0.303 | 0.517 | +70 |
| 8 | 0.63 | 0.02 | 0.200 | 0.340 | +71 |
| Comparative Example C | 0.50 | 0.05 | 0.108 | 0.086 | −20 |
| 9 | 0.57 | 0.03 | 0.219 | 0.339 | +55 |
| 10 | 0.56 | 0.03 | 0.166 | 0.288 | +73 |
| 11 | 0.65 | 0.03 | 0.180 | 0.350 | +94 |
| 12 | 0.55 | 0.02 | 0.240 | 0.590 | +146 |

TABLE 3

| EXAMPLE | PARTS BY WEIGHT | | | | | | | | | | | | |
|---|---|---|---|---|---|---|---|---|---|---|---|---|---|
| | L1 | P1 | SR | S1 | Resin | S2 | AP 280 | AP 600 | AP 400 | AP 1500 | water | PME | P2 |
| Comparative Example A | 12.98 | 0.91 | 3.66 | 0.23 | 31.02 | 2.28 | 48.91 | 0 | 0 | 0 | 0 | 0 | 0 |
| Comparative Example B | 14.49 | 0.79 | 3.15 | 0.20 | 26.73 | 1.97 | 52.68 | 0 | 0 | 0 | 0 | 0 | 0 |
| 1 | 19.11 | 0.40 | 1.60 | 0.10 | 13.58 | 1.00 | 64.22 | 0 | 0 | 0 | 0 | 0 | 0 |
| 2 | 20.16 | 0.31 | 1.25 | 0.08 | 10.60 | 0.78 | 66.83 | 0 | 0 | 0 | 0 | 0 | 0 |
| 5 | 19.11 | 0.4 | 1.6 | 0.1 | 13.58 | 1 | 64.21 | 0 | 0 | 0 | 0 | 0 | 0 |
| 6 | 12.49 | 0 | 1.41 | 0.07 | 13.88 | 0.35 | 0 | 0 | 0 | 59.25 | 10.71 | 1.78 | 0.05 |
| 7 | 12.15 | 0 | 1.62 | 0.08 | 15.92 | 0.40 | 0 | 0 | 0 | 57.61 | 10.42 | 1.74 | 0.06 |
| 8 | 10.88 | 0 | 2.41 | 0.12 | 23.64 | 0.60 | 0 | 0 | 0 | 51.39 | 9.32 | 1.55 | 0.09 |
| Comparative Example C | 10.01 | 0 | 2.95 | 0.15 | 28.91 | 0.73 | 0 | 0 | 0 | 47.14 | 8.58 | 1.43 | 0.11 |

TABLE 4

| EXAMPLE | CaSt add-on, grains/24 in² (gsm) | LiSt add-on, grains/24 in² (gsm) | SCHIEFER TEST | | | | |
|---|---|---|---|---|---|---|---|
| | | | 500 CYCLES CUT | | 4000 CYCLES CUT | | |
| | | | No Stearate, grams | With Stearate, grams | No Stearate, grams | With Stearate, grams | % Change |
| 13 | 0.5 (1.86) | 0 | 0.068 | 0.085 | 0.303 | 0.405 | 34 |
| 14 | 1.5 (5.58) | 0 | 0.068 | 0.082 | 0.303 | 0.392 | 29 |
| 15 | 3 (11.16) | 0 | 0.068 | 0.101 | 0.303 | 0.54 | 78 |
| 16 | 9 (33.49) | 0 | 0.068 | 0.101 | 0.303 | 0.604 | 99 |
| 17 | 30 (111.65) | 0 | 0.068 | 0.134 | 0.303 | 0.625 | 106 |
| 18 | 69 (256.79) | 0 | 0.068 | 0.106 | 0.303 | 0.606 | 100 |
| 19 | 90 (334.95) | 0 | 0.068 | 0.088 | 0.303 | 0.529 | 75 |
| 20 | 0 | 18 (66.99) | 0.068 | 0.145 | 0.303 | 0.534 | 76 |
| 21 | 18 (66.99) | 0 | 0.068 | 0.133 | 0.303 | 0.544 | 79 |

TABLE 5

| | | SCHIEFER TEST | | | | |
| | | 500 CYCLES CUT | | 4000 CYCLES CUT | | |
| EXAMPLE | METAL STEARATE COMPOSITION | No Stearate Overlayer, grams | With Stearate Overlayer, grams | No Stearate Overlayer, grams | With Stearate Overlayer, grams | % Change |
| --- | --- | --- | --- | --- | --- | --- |
| 22 | CaSt1 | 0.068. | 0.138 | 0.303 | 0.532 | +76 |
| 23 | NaSt1 | 0.068 | 0.136 | 0.303 | 0.515 | +70 |
| 24 | NaSt | 0.068 | 0.112 | 0.303 | 0.507 | +67 |
| 25 | BaSt | 0.068 | 0.125 | 0.303 | 0.636 | +109 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A nonwoven abrasive article comprising:
a nonwoven abrasive member having a working surface, wherein the nonwoven abrasive member comprises:
a lofty open fiber web comprising fibers bonded to one another; and
abrasive particles adhered to the fibers by a binder material, and wherein at least a portion of the abrasive particles form a visible outer later, wherein the abrasive particles are closely packed, and wherein on a numerical basis at least 80 percent of the abrasive particles in the visible outer layer have recognizable outlines wherein the working surface of the nonwoven abrasive member has a kinetic coefficient of friction of at least 0.54 according to a FRICTION TEST comprising:
a first test specimen of the nonwoven abrasive member, attached to a metal weight and a second test specimen of polymethyl methacrylate (PMMA) disc, attached to a horizontal test stage, are equilibrated for at least 24 hours at 17 percent relative humidity and 25° C. prior to use;
the first test specimen is place such that a working surface is in contact with the PMMA disc and attached to the load cell of a friction testing machine at 17 percent relative humidity and 25° C.; and
a horizontal force is applied by the friction testing machine at a horizontal stage translational speed of 31 cm/minute and the kinetic coefficient of friction is determined as the average kinetic coefficient of friction over a 5-second interval; and
an overlayer composition disposed on at least a portion of the binder material and abrasive particles adjacent to the working surface thereby forming the nonwoven abrasive article, wherein the overlayer composition comprises a fatty acid metal salt.

2. The nonwoven abrasive article of claim 1, wherein the overlayer composition has a basis weight of at least 2.5 grams per square meter.

3. The nonwoven abrasive article of claim 2, wherein the abrasive particles conform to an abrasives industry specified nominal grade.

4. The nonwoven abrasive article of claim 1, wherein the overlayer composition further comprises a polymeric resin.

5. The nonwoven abrasive article of claim 1, wherein the abrasive particles have an average particle size of at least 5 microns.

6. The nonwoven abrasive article of claim 1, wherein the abrasive particles have an average particle size of less than or equal to 125 microns.

7. A method of making an abrasive article, the method comprising sequentially:
providing a nonwoven abrasive member having a working surface, wherein the nonwoven abrasive member comprises:
a lofty open fiber web comprising fibers bonded to one another;
abrasive particles adhered to the fibers by a binder material, and wherein at least a portion of the abrasive particles form a visible outer later, wherein the abrasive particles are closely packed, and wherein on a numerical basis at least 80 percent of the abrasive particles in the visible outer layer have recognizable outlines wherein the working surface of the nonwoven abrasive member has a kinetic coefficient of friction of at least 0.54 according to a FRICTION TEST comprising:
a first test specimen of the nonwoven abrasive member, attached to a metal weight and a second test specimen of polymethyl methacrylate (PMMA) disc, attached to a horizontal test stage, are equilibrated for at least 24 hours at 17 percent relative humidity and 25° C. prior to use;
the first test specimen is place such that a working surface is in contact with the PMMA disc and attached to the load cell of a friction testing machine at 17 percent relative humidity and 25° C.; and
a horizontal force is applied by the friction testing machine at a horizontal stage translational speed of 31 cm/minute and the kinetic coefficient of friction is determined as the average kinetic coefficient of friction over a 5-second interval; and
disposing an overlayer composition on at least a portion of the binder material and the abrasive particles adjacent to the working surface thereby forming the nonwoven abrasive article, wherein the overlayer composition comprises a fatty acid metal salt.

8. The method of claim 7, wherein the overlayer composition has a basis weight of at least 2.5 grams per square meter.

9. A method of making an abrasive article, the method comprising:
a) providing a nonwoven abrasive member having a working surface, wherein the nonwoven abrasive member comprises:

a lofty open fiber web comprising fibers bonded to one another; and abrasive particles adhered to at least a portion of the fibers by a binder material, wherein at least a portion of the abrasive particles are at least partially embedded in the binder material and wherein at least a portion of the abrasive particles form a visible outer later, wherein the abrasive particles are closely packed, and wherein on a numerical basis at least 80 percent of the abrasive particles in the visible outer layer have recognizable outlines; and b) plasma-etching a portion of the binder material adjacent to the working surface to expose portions of the abrasive particles previously embedded in the binder material to provide a plasma-etched nonwoven abrasive member; and c) disposing an overlayer composition on at least a portion of the working surface of the plasma-etched nonwoven abrasive member, wherein the overlayer composition comprises a fatty acid metal salt.

10. The method of claim 9, wherein the abrasive particles have an average particle size of less than or equal to 125 microns.

11. The method of claim 9, wherein the overlayer composition has a basis weight of at least 2.5 grams per square meter.

* * * * *

UNITED STATES PATENT AND TRADEMARK OFFICE
CERTIFICATE OF CORRECTION

PATENT NO. : 10,850,368 B2
APPLICATION NO. : 16/523419
DATED : December 1, 2020
INVENTOR(S) : Edward Woo et al.

Page 1 of 1

It is certified that error appears in the above-identified patent and that said Letters Patent is hereby corrected as shown below:

On the Title Page

Item (62) under "Related U.S. Application Data", please delete "PCT/EP2014/031248" and insert -- PCT/US2014/031248 --.

In the Specification

Column 19, Line 22, Delete "51," and insert -- S1, --, therefor.

In the Claims

Column 23, Line 33, In Claim 1, delete "later," and insert -- layer, --, therefor.

Column 24, Line 31, In Claim 7, delete "later," and insert -- layer, --, therefor.

Column 25, Line 7, In Claim 9, delete "later," and insert -- layer, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*